United States Patent [19]
Yoshikawa

[11] Patent Number: 5,852,260
[45] Date of Patent: Dec. 22, 1998

[54] PRESSURE SENSITIVE THREE-DIMENSIONAL TABLET AND MANIPULATION DATA DETECTING METHOD THEREFOR

[75] Inventor: Osamu Yoshikawa, Tokyo, Japan

[73] Assignee: SMK Corporation, Tokyo, Japan

[21] Appl. No.: 824,355

[22] Filed: Mar. 25, 1997

[30] Foreign Application Priority Data

Mar. 26, 1996 [JP] Japan .................................... 8-094719

[51] Int. Cl.$^6$ .............................. G08C 21/00; G09G 5/00
[52] U.S. Cl. ..................................... 178/18.01; 178/18.03; 178/18.05; 345/173; 345/174; 345/179
[58] Field of Search ..................................... 345/173, 174, 345/179; 178/18.01, 18.03, 18.05

[56] References Cited

U.S. PATENT DOCUMENTS

| | | | |
|---|---|---|---|
| 4,794,634 | 12/1988 | Torihata et al. ...................... | 178/18.01 |
| 5,008,497 | 4/1991 | Asher .................................... | 178/18.03 |
| 5,369,227 | 11/1994 | Stone .................................... | 178/18.05 |

*Primary Examiner*—Vijay Shankar
*Attorney, Agent, or Firm*—Armstrong, Westerman, Hattori, McLeland and Naughton

[57] ABSTRACT

When a pair of opposed resistance sheets of a pressure sensitive 3D tablet are pressed into contact with each other by a tablet manipulation, an equal current is applied to a reference resistor $R_C$, and the position of contact $(x_p, y_p)$ between both sheets and a first potential difference $V_A$, based on the resistance value $r_C$ of the reference resistor $R_C$ and a second potential difference based on the contact resistance $r_p$ at the contact position, are detected. Since the contact resistance $r_p$ can be detected by $r_P = r_C * V_B / V_A$, the X- and Y-coordinates $(x_p)$ and $(y_p)$ and the contact resistance $r_p$ at the position of contact between the resistance sheets can be detected as 3D independent parameters.

8 Claims, 7 Drawing Sheets

PRESSURE SENSITIVE THREE-DIMENSIONAL TABLET AND MANIPULATION DATA DETECTING METHOD THEREFOR

BACKGROUND OF THE INVENTION

1. Field of the Invention

The present invention relates to a pressure sensitive three-dimensional or 3D tablet which detects the application of pressure thereto by a stylus, finger or similar (hereinafter generically referred to as a stylus) and a method for detecting manipulation data of the pressure sensitive 3D tablet. More particularly, the invention pertains to a pressure sensitive 3D tablet which detects not only the position of the pressure applied thereto but also the contact resistance at that position and a method for detecting manipulation data therefor.

2. Description of the Prior Art

As shown in FIG. 9, a conventional pressure sensitive tablet has a pair of opposed X- and Y-coordinate resistance sheets 101 and 102 slightly separated by an insulating dot spacer or similar (not shown) interposed therebetween. The resistance layers of the X- and Y-coordinate resistance sheets 101 and 102 face each other. The resistance layers are each formed by a uniform or homogeneous resistance material. Hence, when a coordinate detecting voltage is applied to a negative electrode of one of the resistance sheet and the other electrode is grounded, a potential is generated everywhere in the resistance sheet in proportion to the distance from either electrode. Accordingly, potential gradients of the same slope develop.

The coordinate detection in such a pressure sensitive tablet begins with an X-coordinate detection mode in which, under the control of a central processing unit or CPU 105, X-side switches 103 and 104 are closed to generate a potential gradient in the X-coordinate resistance sheet 101 and Y-side switches 108 and 109 are opened. In this instance, a switch 107 connected to the input terminal of an AD converter 106 is connected to a negative electrode 113 of the Y-coordinate resistance sheet 102.

When the X-coordinate resistance sheet 101 is pressed by a stylus at a point P $(x_p, y_p)$, the potential $V_{xp}$ at that point P is given by $V_{CC} * x_1/(x_1+x_2)$, where $x_2$ is the resistance proportional to the distance from an X-side positive electrode 111 and $x_1$ the resistance proportional to the distance from an X-side negative electrode 110, and the potential $V_{xp}$ is read out by the AD converter 106 to detect the x coordinate $(x_p)$.

Next, the pressure sensitive tablet is put in a Y-coordinate detection mode, in which the X-side switches 103 and 104 are opened, the Y-side switches 108 and 109 are closed and the switch 107 connected to the input terminal of the AD converter 106 is connected to the X-side negative electrode of the X-coordinate resistance sheet 101.

Similarly, letting the resistance proportional to the distance from a Y-side positive electrode 112 and the resistance proportional to the distance from a Y-side negative electrode 113 be represented by $y_2$ and $y_1$, respectively, the potential $V_{yp}$ at the point P is given by $V_{CC} * y_1/(y_1+y_2)$. The potential $V_{yp}$ is read out via the AD converter 106 to detect the y coordinate $(y_p)$.

As described above, the position of the stylus pressure applied to the tablet by the manipulation of the stylus is detected in the X- and Y-direction in the X- and Y-coordinate detection modes and the x and y coordinates thus obtained are fed as two-dimensional or 2D tablet manipulation data to a personal computer or similar.

In the personal computer, the tablet manipulation data is used, for example, as cursor-movement control data to move the cursor to a position on the display corresponding to the x- and y-coordinates $(x_p)$ and $(y_p)$.

Thus, shifting the pressed position $(x_p, y_p)$ of the tablet permits cursor-movement control, enabling graphics-drawing, cursor-movement to an icon on the personal computer or PC display. However, the above-described conventional pressure sensitive tablet 100 merely outputs 2D tablet manipulation data by pressing the resistance sheets of the pressure sensitive tablet 100. For example, in the case of changing the thickness of a line while drawing on the PC display or executing an instruction designated by an icon after moving the cursor thereto, it is necessary to provide another switch or similar input device and perform the required operation by the input device in addition to the tablet manipulation.

The addition of such input device to the pressure sensitive tablet inevitably makes it bulky and expensive.

The operation of the additional input device requires the interruption of the tablet manipulation and hence is cumbersome and not friendly. In the case of controlling movement in the direction of depth (Z) in a 3D image rendered on the PC display, continuously changing 3D manipulation data needs to be fed to the personal computer. It is particularly difficult in this instance to perform this operation by the additional input device in combination with the 2D tablet manipulation.

SUMMARY OF THE INVENTION

It is therefore an object of the present invention to provide a pressure sensitive 3D tablet which permits outputting 3D tablet manipulation data only by the addition of a simple arrangement and a method for detecting manipulation data of the pressure sensitive 3D tablet.

A pressure sensitive 3D tablet according to a first aspect of the present invention includes: an X-coordinate resistance sheet having an X-side positive electrode and an X-side negative electrode formed thereon along opposite marginal edges in the X direction; a Y-coordinate resistance sheet having a Y-side positive electrode and a Y-side negative electrode formed thereon along opposite marginal edges in the Y-direction crossing the X-direction at right angles thereto, the Y-coordinate resistance sheet being held opposite the X-coordinate resistance sheet with a slight insulating gap defined therebetween; a reference resistor $R_C$ connected at one end to either one of the X- and Y-side positive electrodes; reference voltage applying facilities for selectively applying a reference detecting voltage $V_{CC}$ to any one of the other end of the reference resistor $R_C$, the X-side positive electrode and the Y-side positive electrodes; and grounding facilities for selectively grounding either one of the X- and Y-side negative electrodes.

This pressure sensitive 3D tablet operates in: an X-coordinate detection mode in which the reference detecting voltage $V_{CC}$ is applied to the X-side positive electrode or the other end of the reference resistor $R_C$ connected thereto and the X-side negative electrode is grounded to form a uniform potential gradient in the X-coordinate resistance sheet, then the potential $V_{xp}$ at the position of contact $(x_p, y_p)$ between the X- and Y-coordinate resistance sheets is read out via the Y-coordinate resistance sheet, and the X-coordinate $(x_p)$ of the contact position is detected from the potential $V_{xp}$; a Y-coordinate detection mode in which the reference detecting voltage $V_{CC}$ is applied to the Y-side positive electrode or the other end of the reference resistor $R_C$ connected thereto and the Y-side negative electrode is grounded to form a uniform potential gradient in the Y-coordinate resistance sheet, then the potential $V_{yp}$ at the contact position $(x_p,y_p)$ between the X- and Y-coordinate resistance sheets is read out via the X-coordinate resistance sheet, and the Y-coordinate $(y_p)$ of the contact position is detected form the potential $V_{yp}$; and a contact resistance detection mode in which the reference detecting voltage $V_{CC}$ is applied to the other end of the reference resistor $R_C$ connected to the positive electrode of either one of the X- and Y-coordinate resistance sheets, then the negative electrode of the other resistance sheet is grounded, and the potentials of the positive and negative electrodes of the resistance sheet supplied with the detecting voltage $V_{CC}$ and the positive electrode of the grounded resistance sheet are read out, and in which, letting a first potential difference between the potential $V_1$ of the positive electrode of the resistance sheet supplied with the detecting voltage $V_{CC}$ and the reference detecting voltage $V_{CC}$ be represented by $V_A$, a second potential difference between the potential $V_2$ of the negative electrode of the resistance sheet supplied with the detecting voltage $V_{CC}$ and the potential of the positive electrode of the grounded resistance sheet by $V_B$ and the resistance value of the reference resistor $R_C$ by $r_C$, the contact resistance $r_p$ at the contact position $(x_p,y_p)$ is detected by $r_p = r_C * V_B / V_A$.

The thus detected X- and Y-coordinates $(x_p)$ and $(y_p)$ and contact resistance $r_p$ at the contact position are used to output tablet manipulation data. In the X-coordinate detection mode, a uniform potential gradient from the ground potential to the reference detecting voltage $V_{CC}$ is formed in the X-coordinate resistance sheet. Since the potential $V_{xp}$ at the contact position $(x_p,y_p)$ is proportional to the distance from the X-side negative electrode, the X-coordinate of the contact position is detected from the potential $V_{xp}$. In the Y-coordinate detection mode, a uniform potential gradient from the ground potential to the reference detecting voltage $V_{CC}$ is formed in the Y-coordinate resistance sheet. Since the potential $V_{yp}$ at the contact position $(x_p,y_p)$ is proportional to the distance from the Y-side negative electrode, the Y-coordinate $(y_p)$ at the contact position is detected from the potential $V_{yp}$.

In the contact resistance detection mode, a current flows from one end of the reference resistor $R_C$ supplied with the reference detecting voltage $V_{CC}$ to the negative electrode of the grounded resistance sheet via a route [reference resistor $R_C$—positive electrode of the resistance sheet supplied with the detecting voltage—resistance sheet supplied with the detecting voltage—contact resistance $r_p$ at the contact position $(x_p,y_p)$—grounded resistance sheet].

At this time, since no current flows through the negative electrode of the resistance sheet supplied with the detecting voltage and the positive electrode of the grounded resistance sheet, the first potential difference $V_A$ represents a voltage drop across the reference resistor $R_C$ and the second potential difference $V_B$ a voltage drop across the contact resistance $r_p$. Furthermore, since the currents flowing through the reference resistor $R_C$ and the contact resistance $r_p$ are equal, the varying contact resistance $r_p$ can be detected by multiplying the resistance value $r_C$ of the reference resistor $R_C$ by the ratio of the second potential difference $V_B$ to the first one $V_A$.

When pressed, the pressure sensitive 3D tablet is put in the X- and Y-coordinate detection modes and the contact resistance detection mode in a sequential order, by which the X- and Y-coordinates $(x_p)$ and $(y_p)$ of the position of contact between both resistance sheets and the contact resistance $r_p$ at that position can be detected. The contact resistance $r_p$ becomes an independent parameter representing the tablet manipulation which is independent of a current (it) flowing therethrough upon application of pressure to the tablet and is free from the influence of the position of contact $(x_p,y_p)$ of the both resistance sheets. The X- and Y-coordinates $(x_p)$ and $(y_p)$ and contact resistance $r_p$ are used to generate tablet manipulation data. Hence, by performing the tablet manipulation while shifting the position $(x_p,y_p)$ at which the tablet is pressed and changing the pressure and the area being pressed, 3D data can be fed to a personal computer or similar equipment.

A pressure sensitive 3D tablet according to a second aspect of the present invention includes: an X-coordinate resistance sheet having an X-side main electrode and an X-side grounding electrode formed thereon along opposite marginal edges in the X-direction and an X-side positive electrode and an X-side negative electrode formed as auxiliary electrodes inside the X-side main electrode and the X-side grounding electrode in parallel therewith; a Y-coordinate resistance sheet having a Y-side main electrode and a Y-side grounding electrode formed thereon along opposite marginal edges in the Y-direction crossing the X-direction at right angles thereto and a Y-side positive electrode and a Y-side negative electrode formed as auxiliary electrodes inside the Y-side main electrode and the Y-side grounding electrode in parallel therewith, the Y-coordinate resistance sheet being held opposite the X-coordinate resistance sheet with a slight insulating gap defined therebetween; reference voltage applying facilities for selectively applying a reference detecting voltage $V_{CC}$ to either one of the X- and Y-side main electrodes; and grounding facilities for selectively grounding either one of the X- and Y-side grounding electrodes.

This pressure sensitive 3D tablet operates in: an X-coordinate detection mode in which the reference detecting voltage $V_{CC}$ is applied to the X-side main electrode and the X-side grounding electrode is grounded to form a uniform potential gradient between the X-side positive and negative electrodes, then the potential $V_{xp}$ at the position of contact $(x_p,y_p)$ between the X- and Y-coordinate resistance sheets is read out via the Y-coordinate resistance sheet, and the X-coordinate $(x_p)$ of the contact position is detected from the potential $V_{xp}$; a Y-coordinate detection mode in which the reference detecting voltage $V_{CC}$ is applied to the Y-side main electrode and the Y-side grounding electrode is grounded to form a uniform potential gradient between the Y-side positive and negative electrodes, then the potential $V_{yp}$ at the contact position $(x_p,y_p)$ between the X- and Y-coordinate resistance sheets is read out via the X-coordinate resistance sheet, and the Y-coordinate $(y_p)$ of the contact position is detected form the potential $V_{yp}$; and a contact resistance detection mode in which the reference detecting voltage $V_{CC}$ is applied to the main electrode of either one of the X- and Y-coordinate resistance sheets, then the grounding electrode of the other resistance sheet is grounded, and the potentials of the positive and negative electrodes of the resistance sheet supplied with the detecting voltage $V_{CC}$ and the positive electrode of the grounded resistance sheet are read out, and in which, letting a first potential difference between the potential $V_1$ of the positive electrode of the resistance sheet supplied with the detecting voltage $V_{CC}$ and the reference detecting voltage $V_{CC}$ be represented by $V_A$, a second potential difference between the potential $V_2$ of the negative electrode of the resistance sheet supplied with the detecting voltage $V_{CC}$ and the potential $V_3$ of the positive electrode of the grounded resistance sheet by $V_B$ and the resistance value between the main electrode and the positive electrode of the resistance sheet supplied with the detecting voltage $V_{CC}$ by the resistance value $r_C$ of the reference resistor $R_C$, the contact resistance $r_p$ at the contact position $(x_p, y_p)$ is detected by $r_p = r_C * V_B/V_A$.

The thus detected X- and Y-coordinates $(x_p)$ and $(y_p)$ and contact resistance $r_p$ at the contact position are used to output tablet manipulation data. In the X-coordinate detection mode, a uniform potential gradient is formed between the X-side positive and negative electrodes. Since the potential $V_{xp}$ at the contact position $(x_p, y_p)$ increases in proportion to the distance from the X-side negative electrode, the X-coordinate $(x_p)$ of the contact position is detected from the potential $V_{xp}$.

In the Y coordinate detection mode, a uniform potential gradient is formed between the Y-side positive and negative electrodes. Since the potential $V_{yp}$ at the contact position $(x_p, y_p)$ is proportional to the distance from the Y-side negative electrode, the Y-coordinate $(y_p)$ at the contact position is detected from the potential $V_{yp}$.

Since the X- and Y-coordinates $(x_p)$ and $(y_p)$ are detected from the potential between the auxiliary electrodes between which the uniform potential gradient is generated, the contact position can be detected with high resolution between the auxiliary electrodes. In the contact resistance detection mode, a current flows from the main electrode supplied with the reference detecting voltage $V_{CC}$ to the grounding electrode of the grounded resistance sheet via a route [reference resistor $R_C$—positive electrode of the resistance sheet supplied with the detecting voltage—resistance sheet supplied with the detecting voltage—contact resistance $r_p$ at the contact position $(x_p, y_p)$—negative electrode of the grounded resistance sheet].

At this time, since no current flows through the grounding electrode of the resistance sheet supplied with the detecting voltage and the main electrode of the grounded resistance sheet, the contact resistance $r_p$ can be detected by multiplying the resistance value $r_C$ of the reference resistor $R_C$ by the ratio of the second potential difference $V_B$ to the first one $V_A$. Since the resistance value $r_C$ of the reference resistor $R_C$ uses the resistance value of the resistance sheet between the main and auxiliary electrodes, the reference resistor $R_C$ need not be provided if the resistance value is premeasured.

When pressed, the pressure sensitive 3D tablet is put in the X- and Y-coordinate detection modes and the contact resistance detection mode in a sequential order, by which the X- and Y-coordinates $(x_p)$ and $(y_p)$ of the position of contact between both resistance sheets and the contact resistance $r_p$ at that position can be detected. Of them, the contact resistance $r_p$ becomes an independent parameter representing the tablet manipulation which is independent of a current (it) flowing therethrough upon application of pressure to the tablet and is free from the influence of the position of contact $(x_p, y_p)$ of both resistance sheets.

These X- and Y-coordinates $(x_p)$ and $(y_p)$ and contact resistance $r_p$ are used to generate tablet manipulation data. Hence, by performing the tablet manipulation while shifting the position $(x_p, y_p)$ of pressing the tablet and changing the pressure and the area being pressed, 3D data can be fed to a personal computer or similar equipment.

A pressure sensitive 3D tablet according to a third aspect of the present invention includes: an X-coordinate resistance sheet having an X-side positive electrode and an X-side negative electrode formed thereon along opposite marginal edges in the X direction; a Y-coordinate resistance sheet having a Y-side positive electrode and a Y-side negative electrode formed thereon along its opposite marginal edges in the Y-direction crossing the X-direction at right angles thereto, the Y-coordinate resistance sheet being held opposite the X-coordinate resistance sheet with a slight insulating gap defined therebetween; a reference resistor $R_C$ connected at one end to either one of the X- and Y-side negative electrodes; reference voltage applying facilities for selectively applying a reference detecting voltage $V_{CC}$ to either one of the X- and Y-side positive electrodes; and grounding facilities for selectively grounding either one of the X- and Y-side negative electrodes.

This pressure sensitive 3D tablet operates in: an X-coordinate detection mode in which the reference detecting voltage $V_{CC}$ is applied to the X-side positive electrode and the X-side negative electrode or the other end of the reference resistor $R_C$ connected thereto is grounded to form a uniform potential gradient in the X-coordinate resistance sheet, then the potential $V_{xp}$ at the position of contact $(x_p, y_p)$ between the X- and Y-coordinate resistance sheets is read out via the Y-coordinate resistance sheet, and the X-coordinate $(x_p)$ of the contact position is detected from the potential $V_{xp}$; a Y-coordinate detection mode in which the reference detecting voltage $V_{CC}$ is applied to the Y-side positive electrode and the Y-side negative electrode or the other end of the reference resistor $R_C$ connected thereto is grounded to form a uniform potential gradient in the Y-coordinate resistance sheet, then the potential $V_{yp}$ at the contact position $(x_p, y_p)$ between the X- and Y-coordinate resistance sheets is read out via the X-coordinate resistance sheet, and the Y-coordinate $(y_p)$ of the contact position is detected form the potential $V_{yp}$; and a contact resistance detection mode in which the other end of the reference resistor $R_C$ connected to either one of the X- and Y-coordinate resistance sheets is grounded, then the reference detecting voltage $V_{CC}$ is applied to the positive electrode of the other resistance sheet, and the potentials of the negative electrode of the resistance sheet supplied with the detecting voltage $V_{CC}$ and the positive and negative electrodes of the resistance sheet not supplied with the reference detecting voltage $V_{CC}$ are read out, and in which, letting a first potential difference between the potential $V_1$ of the negative electrode of the resistance sheet not supplied with the detecting voltage $V_{CC}$ and the ground potential be represented by $V_A'$, a second potential difference between the potential $V_2$ of the negative electrode of the resistance sheet supplied with the detecting voltage $V_{CC}$ and the potential $V_3$ of the positive electrode of the resistance sheet not supplied with the detecting voltage $V_{CC}$ by $V_B'$ and the resistance value of the reference resistor $R_C$ by $r_C$, the contact resistance $r_p$ at the contact position $(x_p, y_p)$ is detected by $r_p = r_C * V_B'/V_A'$.

The thus detected X- and Y-coordinates $(x_p)$ and $(y_p)$ and contact resistance $r_p$ at the contact position are used to output tablet manipulation data.

In the X-coordinate detection mode, a uniform potential gradient from the ground potential to the reference detecting voltage $V_{CC}$ is formed in the X-coordinate resistance sheet. Since the potential $V_{xp}$ at the contact position $(x_p, y_p)$ is proportional to the distance from the X-side negative electrode, the X-coordinate $(x_p)$ of the contact position is detected from the potential $V_{xp}$.

In the Y-coordinate detection mode, a uniform potential gradient from the ground potential to the reference detecting voltage $V_{CC}$ is formed in the Y-coordinate resistance sheet. Since the potential $V_{yp}$ at the contact position $(x_p, y_p)$ is proportional to the distance from the Y-side negative electrode, the Y-coordinate ($y_p$) at the contact position is detected from the potential $V_{yp}$.

In the contact resistance detection mode, a current flows from the positive electrode of resistance sheet supplied with the reference detecting voltage $V_{CC}$ to the reference resistor $R_C$ via a route [resistance sheet supplied with the detecting voltage—contact resistance $r_p$ at the contact position ($x_p,y_p$) —grounded resistor sheet—negative electrode of the grounded resistance sheet].

At this time, since no current flows through the negative electrode of the resistance sheet supplied with the detecting voltage and the positive electrode of the grounded resistance sheet, the first potential difference $V_A'$ represents a voltage drop across the reference resistor $R_C$ and the second potential difference $V_B'$ voltage drop across the contact resistance $r_p$. Furthermore, since the currents flowing through the reference resistor $R_C$ and the contact resistance $r_p$ are equal, the varying contact resistance $r_p$ can be detected by multiplying the resistance value $r_C$ of the reference resistor $R_C$ by the ratio of the second potential difference $V_B'$ to the first one $V_A'$.

When pressed, the pressure sensitive 3D tablet is put in the X- and Y-coordinate detection modes and the contact resistance detection mode in a sequential order, by which the X- and Y-coordinates ($x_p$) and ($y_p$) of the position of contact between both resistance sheets and the contact resistance $r_p$ at that position can be detected. The contact resistance $r_p$ becomes an independent parameter representing the tablet manipulation which is independent of a current (it) flowing therethrough upon application of pressure to the tablet and is free from the influence of the position of contact ($x_p,y_p$) of both resistance sheets.

These X- and Y-coordinates ($x_p$) and ($y_p$) and contact resistance $r_p$ are used to generate tablet manipulation data. Hence, by performing the tablet manipulation while shifting the position ($x_p,y_p$) of pressing the tablet and changing the pressure and the area being pressed, 3D data can be fed to a personal computer or similar equipment.

A pressure sensitive 3D tablet according to a fourth aspect of the present invention includes: an X-coordinate resistance sheet having an X-side main electrode and an X-side grounding electrode formed thereon along opposite marginal edges in the X-direction and an X-side positive electrode and an X-side negative electrode formed as auxiliary electrodes inside the X-side main electrode and the X-side grounding electrode in parallel therewith; a Y-coordinate resistance sheet having a Y-side main electrode and a Y-side grounding electrode formed thereon along opposite marginal edges in the Y-direction crossing the X-direction at right angles thereto and a Y-side positive electrode and a Y-side negative electrode formed as auxiliary electrodes inside the Y-side main electrode and the Y-side grounding electrode in parallel therewith, the Y-coordinate resistance sheet being held opposite the X-coordinate resistance sheet with a slight insulating gap defined therebetween; reference voltage applying facilities for selectively applying a reference detecting voltage $V_{CC}$ to either one of the X- and Y-side main electrodes; and grounding facilities for selectively grounding either one of the X- and Y-side grounding electrodes.

This pressure sensitive 3D tablet operates in: an X-coordinate detection mode in which the reference detecting voltage $V_{CC}$ is applied to the X-side main electrode and the X-side grounding electrode is grounded to form a uniform potential gradient between the X-side positive and negative electrodes, then the potential $V_{xp}$ at the position of contact ($x_p,y_p$) between the X- and Y-coordinate resistance sheets is read out via the Y-coordinate resistance sheet, and the X-coordinate ($x_p$) of the contact position is detected from the potential $V_{xp}$; a Y-coordinate detection mode in which the reference detecting voltage $V_{CC}$ is applied to the Y-side main electrode and the Y-side grounding electrode is grounded to form a uniform potential gradient between the Y-side positive and negative electrodes, then the potential $V_{yp}$ at the contact position ($x_p,y_p$) between the X- and Y-coordinate resistance sheets is read out via the X-coordinate resistance sheet, and the Y-coordinate ($y_p$) of the contact position is detected form the potential $V_{yp}$; and a contact resistance detection mode in which the grounding electrode of either one of the X- and Y-coordinate resistance sheets is grounded, then the reference detecting voltage $V_{CC}$ is applied to the main electrode of the other resistance sheet, and the potentials of the negative electrode of the resistance sheet supplied with the detecting voltage $V_{CC}$ and the positive and negative electrodes of the resistance sheet not supplied with the detecting voltage $V_{CC}$ are read out, and in which, letting a first potential difference between the potential $V_1$ of the negative electrode of the resistance sheet not supplied with the detecting voltage $V_{CC}$ and the ground potential be represented by $V_A'$ and a second potential difference between the potential $V_2$ of the negative electrode of the resistance sheet supplied with the detecting voltage $V_{CC}$ and the potential $V_3$ of the positive electrode of the resistance sheet not supplied with the detecting voltage $V_{CC}$ by $V_B'$ and the resistance value between the grounding electrode and the negative electrode of the resistance sheet not supplied with the detecting voltage $V_{CC}$ by the resistance value $r_C$ of the reference resistor $R_C$, the contact resistance $r_p$ at the contact position ($x_p,y_p$) is detected by $r_p = r_C * V_B'/V_A'$.

The thus detected X- and Y-coordinates ($x_p$) and ($y_p$) and contact resistance $r_p$ at the contact position are used to output tablet manipulation data.

In the X-coordinate detection mode, a uniform potential gradient is formed between the X-side positive and negative electrodes. Since the potential $V_{xp}$ at the contact position ($x_p,y_p$) increases in proportion to the distance from the X-side negative electrode, the X-coordinate ($x_p$) of the contact position is detected from the potential $V_{xp}$.

In the Y-coordinate detection mode, a uniform potential gradient is formed between the Y-side positive and negative electrodes. Since the potential $V_{yp}$ at the contact position ($x_p,y_p$) is proportional to the distance from the Y-side negative electrode, the Y-coordinate ($y_p$) at the contact position is detected from the potential $V_{yp}$.

Since the X- and Y-coordinates ($x_p$) and ($y_p$) are detected from the potential between the auxiliary electrodes between which the uniform potential gradient is generated, the contact position can be detected with high resolution between the auxiliary electrodes.

In the contact resistance detection mode, a current flows from the main electrode supplied with the reference detecting voltage $V_{CC}$ to the reference resistor $R_C$ via a route [resistance sheet supplied with the detecting voltage— contact resistance $r_p$ at the contact position ($x_p,y_p$)— grounded resistance sheet—negative electrode of the grounded resistance sheet].

At this time, since no current flows through the grounding electrode of the resistance sheet supplied with the detecting voltage and the main electrode of the grounded resistance sheet, the contact resistance $r_p$ can be detected by multiplying the resistance value $r_C$ of the reference resistor $R_C$ by the ratio of the second potential difference $V_B$ to the first one $V_A$. Since the resistance value $r_C$ of the reference resistor $R_C$ uses the resistance value of the resistance sheet between the main and auxiliary electrodes, the reference resistor $R_C$ need not be provided if the resistance value is premeasured.

When pressed, the pressure sensitive 3D tablet is put in the X- and Y-coordinate detection modes and the contact resistance detection mode in a sequential order, by which the X- and Y-coordinates $(x_p)$ and $(y_p)$ of the position of contact between both resistance sheets and the contact resistance $r_p$ at that position can be detected.

These X- and Y-coordinates $(x_p)$ and $(y_p)$ and contact resistance $r_p$ are used to generate tablet manipulation data. Hence, by performing the tablet manipulation while shifting the position $(x_p,y_p)$ of pressing the tablet and changing the pressure and the area being pressed, 3D data can be fed to a personal computer or similar equipment.

In the pressure sensitive 3D tablet according to a fifth aspect of the present invention, when the contact resistance $r_p$ detected in the contact resistance detection mode goes below a predetermined stylus pressure detecting threshold value, it is decided that the tablet is being pressed.

In the contact resistance detection mode, since no current flows through either of the resistance sheets unless they are pressed, no current is consumed during the detection of the stylus pressure applied to the tablet.

When the tablet is pressed, the contact resistance $r_p$ sharply decreases from infinity and, when the contact resistance $r_p$ is below a certain value $r_M$, its variation becomes stabilized to such an extent as not to affect the coordinate detection in the X- and Y-coordinate detection modes. Thus, the certain value $r_M$ can be set at the stylus pressure detecting threshold value thus, permitting an accurate coordinate detection.

Since the detection of the application of pressure to the resistance sheets can be decided by comparing the stylus pressure detecting threshold value $r_T$ directly with the contact resistance value $r_p$, the decision can be made independently of the position of the pressure being applied.

In the pressure sensitive 3D tablet according to the sixth aspect of the present invention, the reference resistor $R_C$ is a variable resistor.

The resistance value $r_C$ of the reference resistor $R_C$ can be adjusted to be equal to the resistance value $r_M$ when the variation in the contact resistance $r_p$ decreases to such an extent as not to affect the coordinate detection. Hence, when the contact resistance $r_p$ goes below the value $r_M$, the second potential difference $V_B$ becomes larger than the first potential difference $V_A$ and, only by comparing the first and second potential differences $V_A$ and $V_B$, can the application of the stylus pressure be detected.

The ratio between the first and second potential differences $V_A$ and $V_B$, which are compared in the detection of the stylus pressure, can be changed by adjusting the resistance value $r_C$ of the reference resistor $R_C$.

According to a seventh aspect of the present invention, there is provided a method for detecting manipulation data of a pressure sensitive 3D tablet which is composed of a pair of opposed X- and Y-coordinate resistance sheets with a slight insulating gap defined therebetween and is adapted to be manipulated by pressing one of the X- and Y-coordinate resistance sheets into contact with the other.

The method includes the steps of: forming a uniform potential gradient in the X-coordinate resistance sheet and detecting the X-coordinate $(x_p)$ of the position of contact $(x_p,y_p)$ with the Y-coordinate resistance sheet from the potential $V_{xp}$ at the contact position; forming a uniform potential gradient in the Y-coordinate resistance sheet and detecting the Y-coordinate $(x_p)$ of the position of its contact $(x_p,y_p)$ with the X-coordinate resistance sheet from the potential $V_{xp}$ at the contact position; applying a reference detecting voltage $V_{CC}$ to one of the X- and Y-coordinate resistance sheets via a reference resistor $R_C$ and grounding the other resistance sheet; and detecting the contact resistance $r_p$ at the contact position $(x_p,y_p)$ by $r_p=r_C*V_B/V_A$, where $V_A$ is a first potential difference across the reference resistor $R_C$, $V_B$ a second potential difference between the X- and Y-coordinate sheets at the contact position $(x_p,y_p)$ thereof and $r_C$ the resistance value of the reference resistor $R_C$.

According to an eighth aspect of the present invention, there is provided a method of detecting manipulation data for a pressure sensitive 3D tablet which is composed of a pair of opposed X- and Y-coordinate resistance sheets with a slight insulating gap defined therebetween and is adapted to be manipulated by pressing one of the X- and Y-coordinate resistance sheets into contact with the other.

The method includes the steps of: forming a uniform potential gradient in the X-coordinate resistance sheet and detecting the X-coordinate $(x_p)$ of the position of contact $(x_p,y_p)$ with the Y-coordinate resistance sheet from the potential $V_{xp}$ at the contact position; forming a uniform potential gradient in the Y-coordinate resistance sheet and detecting the Y-coordinate $(x_p)$ of the position of its contact $(x_p,y_p)$ with the X-coordinate resistance sheet from the potential $V_{xp}$ at the contact position; applying a reference detecting voltage $V_{CC}$ to one of the X- and Y-coordinate resistance sheets via a reference resistor $R_C$ and grounding the other resistance sheet; and detecting the contact resistance $r_p$ at the contact position $(x_p,y_p)$ by $r_p=r_C*V_B'/V_A'$, where $V_A'$ is a first potential difference across the reference resistor $R_C$, $V_B'$ a second potential difference between the X- and Y-coordinate sheets at the contact position $(x_p,y_p)$ thereof and $r_C$ the resistance value of the reference resistor $R_C$.

With the methods according to the seventh and eighth aspect of the invention, when one of the resistance sheets of the tablet is pressed into contact with the other, the X coordinate $(x_p)$ of the contact position, the Y coordinate $(y_p)$ of the contact position and the contact resistance $r_p$ are independent parameters representing the application of pressure to the tablet by forming a uniform potential gradient in the X-coordinate resistance sheet, by forming a uniform potential gradient in the Y-coordinate resistance sheet and by flowing an equal current to the reference resistor $R_C$ and the contact position $(x_p,y_p)$, respectively.

Accordingly, independent pieces of data about the tablet manipulation can be fed to a personal computer or similar by manipulating the tablet while shifting the position of the application of pressure $(x_p,y_p)$ to the resistance sheets and changing the pressure and the area of the pressure being applied.

DESCRIPTION OF THE PREFERRED EMBODIMENTS

With reference to the accompanying drawings, embodiments of the present invention will hereinafter be described.

Figure 1:
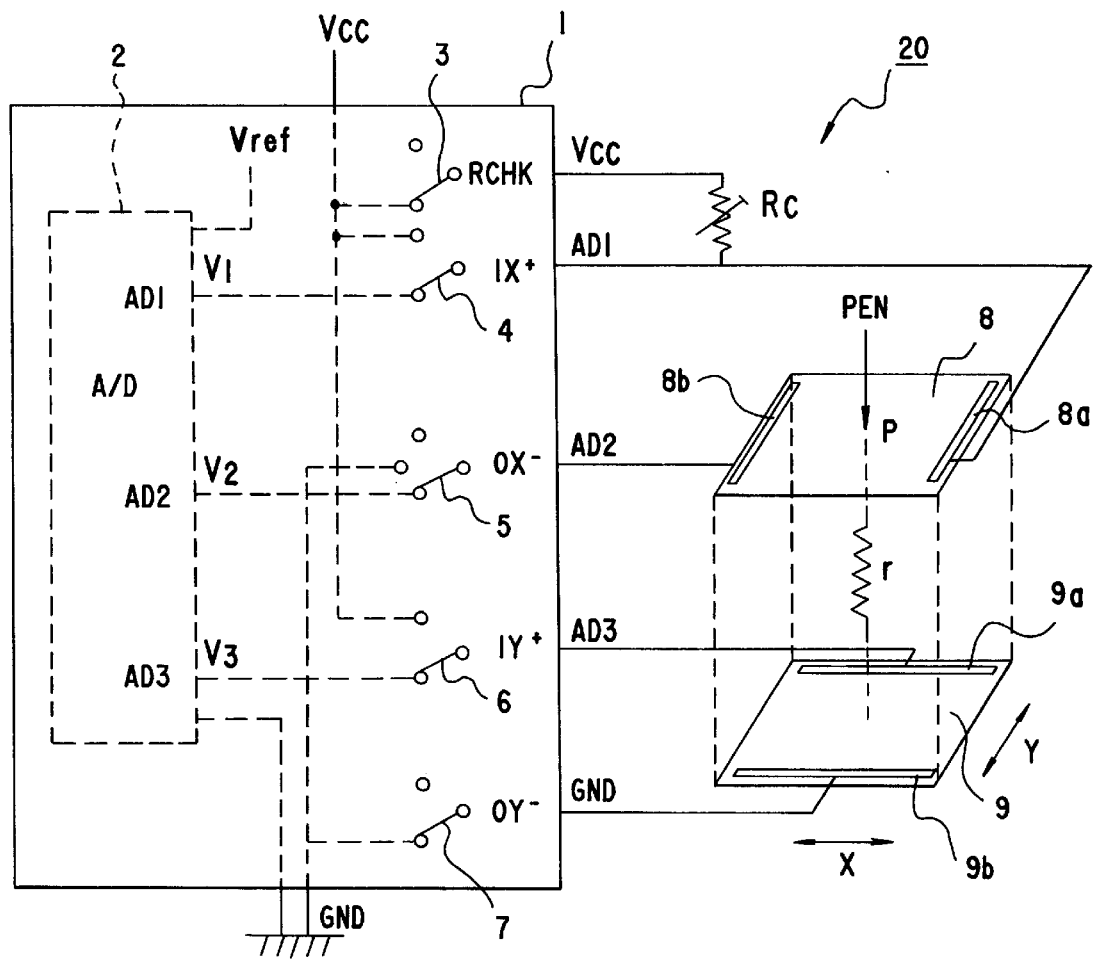
FIG. 1 is a circuit diagram of a pressure sensitive 3D tablet according to a first embodiment of the present invention.

FIGS. 1–4 illustrate a pressure sensitive 3D tablet 20 according to a first embodiment of the present invention. In FIG. 1, a CPU 1 has a built-in AD converter 2, which has three input terminals AD1, AD2 and AD3 and is capable of simultaneously detecting potentials at the three input terminals AD1, AD2 and AD3.

The CPU 1 has five input/output terminals RCHK, IX$^+$, OX$^-$, IY$^+$ and OY$^-$, which are connected to electronic switches 3 to 7 for selectively connecting them to internal circuits of the CPU 1. The electronic switches 3 to 7 individually operate under the control of the CPU 1 to switch the connection of the above-mentioned five input/output terminals to the internal circuits.

Reference numerals 8 and 9 denote a pair of opposed X- and Y-coordinate resistance sheets coated uniformly all over their inside surfaces with resistance layers and slightly spaced apart by dot-like insulating spacers (not shown) printed on their opposed surfaces.

As shown, the X-coordinate resistance sheet 8 has positive and negative electrodes 8a and 8b formed thereon along opposite marginal edges in the X direction. The positive electrode 8a is connected to the terminals IX$^+$ of the CPU 1 and the terminal RCHK via a variable resistor R$_C$ which is a reference resistor, whereas the negative electrode 8b is connected to the terminal OX$^-$ of the CPU 1.

Similarly, the Y-coordinate resistance sheet 9 has positive and negative electrodes 9a and 9b formed thereon along opposite marginal edges in the Y-direction. The positive electrode 9a is connected to the terminal IY$^+$ of the CPU 1 and the negative electrode 9b the terminal OY$^-$ of the CPU 1.

In the pressure sensitive 3D tablet of such a construction as described above, the resistance value r$_C$ of the variable resistor R$_C$ is initialized in accordance with a stylus pressure detecting threshold value r$_T$ that is used as the sensitivity for detecting the stylus pressure applied to the resistance sheets of the tablet 20. The method for this initialization will be described later on. The resistance value r$_C$ of the variable resistor R$_C$ thus initialized is adjusted to a value equal to a resistance value r$_M$ and consequently the stylus pressure detecting threshold value r$_T$ when a change in contact resistance r$_p$ becomes stabilized to such an extent as not to affect the coordinate detection in X- and Y-coordinate detection modes.

The pressure sensitive 3D tablet 20 is in a contact pressure detection mode while it is not manipulated and, upon application thereto of the stylus pressure, it detects the contact resistance r$_p$ at the position of the stylus pressure being applied and compares the detected contact resistance r$_p$ with the stylus pressure detecting threshold value r$_T$.

In the contact resistance detection mode, the electronic switches 3 to 7 of the CPU 1 are controlled to operate as shown in FIG. 1, connecting the input/output terminals of the CPU 1 to the internal circuits thereof.

That is, the terminal RCHK$^+$ is connected via the switch 3 to the power supply V$_{CC}$ to apply a reference detecting voltage V$_{CC}$ via the variable resistor R$_C$ to the positive electrode 8a of the X-coordinate resistance sheet 8. The input/output terminals IX$^+$, OX$^-$ and IY$^+$ are connected to the input terminals AD1, AD2 and AD3 of the AD converter 2 via the switches 4, 5 and 6, respectively, to detect the potentials at the positive and negative electrodes 8a and 8b of the X-coordinate resistance sheet 8 and the positive electrode 9a of the Y-coordinate resistance sheet 9. The remaining input/output terminal OY$^-$ is connected via the electronic switch 7 to a grounding terminal to keep the negative electrode 9b of the Y-coordinate resistance sheet 9 at the ground level.

Figure 2:
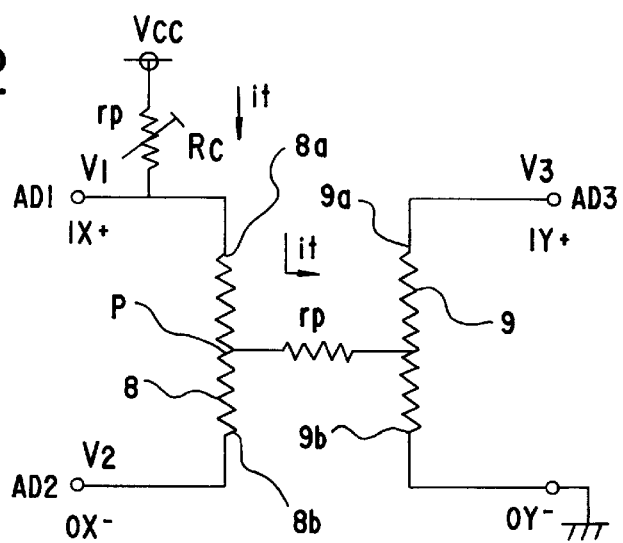
FIG. 2 is an equivalent circuit diagram of the FIG. 1 tablet in the contact resistance detection mode.

FIG. 2 is an equivalent circuit diagram of the pressure sensitive 3D tablet shown in FIG. 1. When no pressure is being applied to the tablet 20, the X-coordinate resistance sheet 8 is held at the reference detection voltage V$_{CC}$ and the Y-coordinate resistance sheet 9 at the ground level. Consequently, no current flows in the resistance sheets 8 and 9 and across them. That is, no current is consumed when no stylus is being pressed against the tablet 20.

When the X-coordinate resistance sheet 8 is pressed, a current (it) flows therefrom to the Y-coordinate resistance sheet 9 via a contact resistance at the position P where the resistance sheet 8 is being pressed. At this time, if minute currents (it) flowing toward the input/output terminals IX$^+$, OX$^-$ and IY$^+$ connected to the AD converter 2 are ignored, the current (it) flows across the variable resistor R$_C$ and the contact resistor r$_p$.

Letting the potential differences across the variable resistor R$_C$ and the contact resistor r$_p$ be represented by first and second potential differences V$_A$ and V$_B$, respectively, and the resistance value of the variable resistor R$_C$ serving as a reference resistor by r$_C$, the contact resistance r$_p$ can be detected by r$_p$=r$_C$*V$_B$/V$_A$ on the basis of the relationship V$_A$/r$_C$=V$_B$/r$_p$.

As is evident from FIG. 2, the first potential difference V$_A$ and the second potential difference V$_B$ can be obtained from the known reference detecting voltage V$_{CC}$ and the potential V$_1$ at the input terminal AD1 of the AD converter 2 and from the potentials V$_2$ and V$_3$ at the input terminals AD2 and AD3 of the AD converter 2, so that the CPU 1 computes the contact resistance r$_p$ from r$_p$=r$_C$*V$_B$/V$_A$.

The computation of the contact resistance r$_p$ is not affected by the current (it) that flows in this mode. That is, even if the current flowing across the resistance sheets 8 and 9 varies with a change in the position of contact (x$_p$, y$_p$) therebetween, the contact resistance r$_p$ can be detected independently of the current and hence, can be detected as a parameter completely independent of the X- and Y-coordinates (x$_p$) and (y$_p$) of the position P of contact between the resistance sheets 8 and 9.

The above-mentioned equation can be replaced with r$_p$/r$_C$=V$_B$/V$_A$ and since in this embodiment the resistance value r$_C$ of the variable resistor R$_C$ is set at a value equal to the stylus pressure detecting threshold value r$_T$, the equation becomes r$_p$/r$_T$=V$_B$/V$_A$.

That is, since the second potential difference $V_B$ goes below the first potential difference $V_A$, when the contact resistance $r_p$ becomes lower than the stylus pressure detecting threshold value $r_T$, the CPU 1 directly compares the first and second potential differences $V_A$ and $V_B$ without performing the above-mentioned computation of the contact resistance $r_p$ and, when the second potential difference $V_B$ goes below the first potential difference $V_A$, it is decided that the tablet is being pressed by the stylus.

Prior to the tablet manipulation, the CPU 1 only compares the potential differences $V_A$ and $V_B$ and does not compute the contact resistance $r_p$.

Upon detecting the application of the stylus pressure, the CPU 1 computes the contact resistance $r_p$ and then goes into the X- and Y-coordinates detecting mode.

In the detection of the application of the stylus pressure, the contact resistance $r_p$ remains below the stylus pressure detecting threshold value $r_T$, that is, below the aforementioned certain value $r_M$ at which the variation in the contact resistance $r_p$ is stabilized, so that the coordinate detection in the subsequent X- and Y-coordinate detecting modes is not ever affected by the fluctuation in the contact resistance $r_p$.

In the X- and Y-coordinates detection modes, a potential gradient is developed in the X- and Y-coordinate resistance sheets 8 and 9 alternately with each other to detect the X- and Y-coordinates of the position P of the stylus pressure being applied. In these modes, the electronic switch 3 connected to the terminal RCHL$^+$ is turned off to disconnect the reference resistor $R_C$ from circuits of the resistance sheets.

Figure 3:
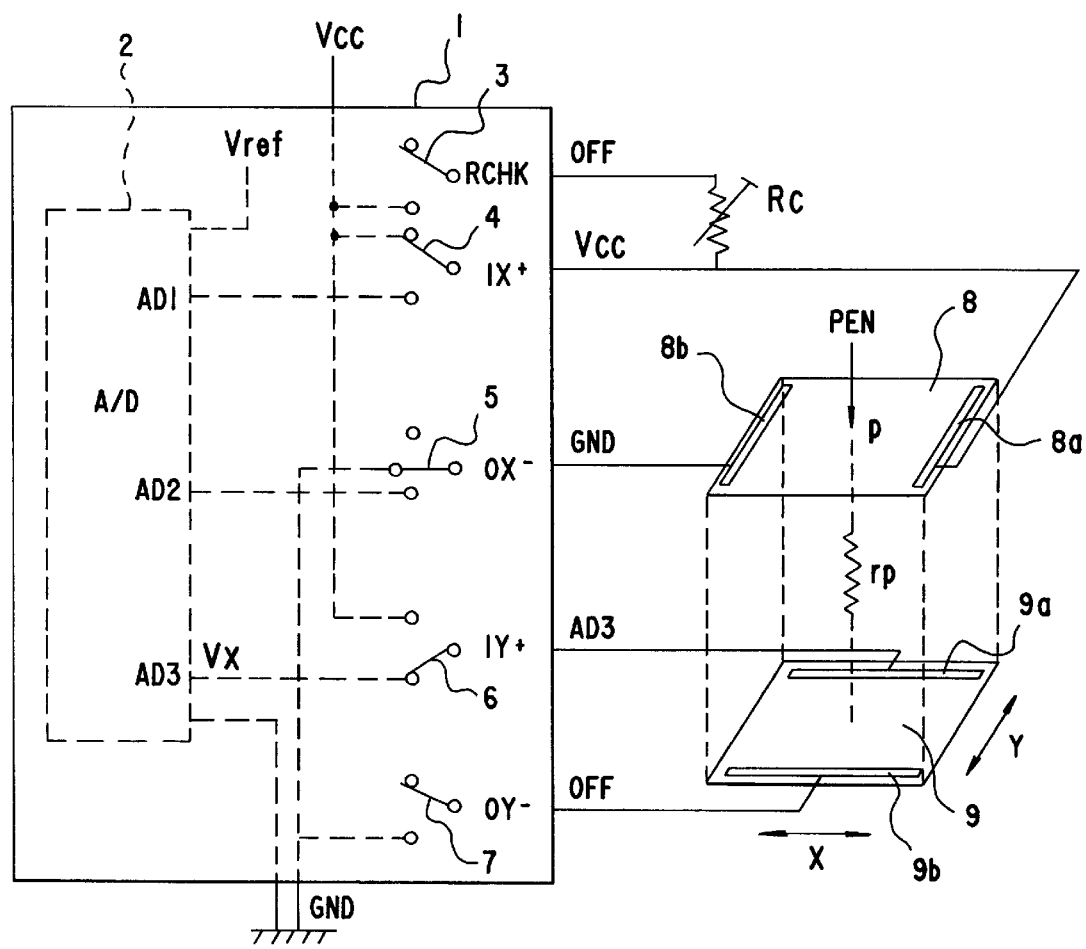
FIG. 3 is a circuit diagram of the FIG. 1 tablet in the X-coordinate detection mode.

FIG. 3 shows the pressure sensitive 3D tablet 20 in the X-coordinate detection mode in which the potential gradient is formed in the X-coordinate resistance sheet 8.

In this instance, the input/output terminal IX$^+$ is connected via the electronic switch 4 to the power supply $V_{CC}$ to apply therefrom the reference detecting voltage $V_{CC}$ to the positive electrode 8a of the X-coordinate resistance sheet 8 through the input terminal IX$^+$. At the same time, the input/output terminal OX$^-$ is grounded via the electronic switch 5 to ground the negative electrode 8b of the X-coordinate resistance sheet 8. Thus, a uniform potential gradient is developed in the X-coordinate resistance sheet 8.

Further, the input/output terminal OY$^-$ connected to the negative electrode 9b of the Y-coordinate resistance sheet 9 is disconnected therefrom by turning off the electronic switch 7 so that no current flows to the Y-coordinate resistance sheet 9 from the position of its contact with the X-coordinate resistance sheet 8. At the same time, the input/output terminal IY$^+$ is connected via the electronic switch 6 to the input terminal AD3 of the AD converter 2. Thus, the potential at the position P of the stylus pressure being applied is detected from the positive electrode 9a of the Y-coordinate resistance sheet 9.

The CPU 1 computes and detects the X-coordinate ($x_p$) of the contact position P from the potential $V_{xp}$ detected at the input terminal AD3. The method for detecting the X-coordinate ($x_p$) of the contact position P from the potential $V_{xp}$ is identical with the afore-mentioned conventional method, and hence it will not be described.

Figure 4:
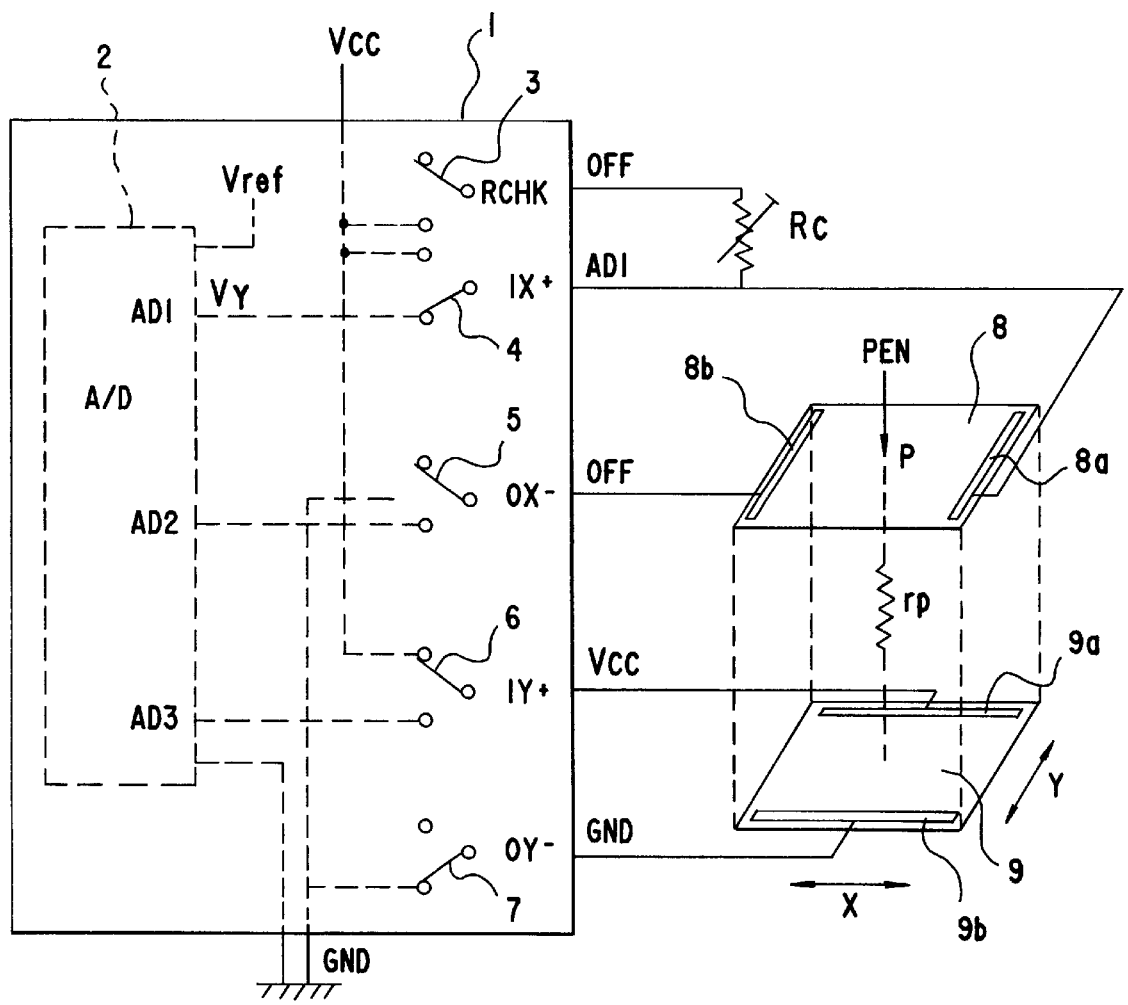
FIG. 4 is a circuit diagram of the FIG. 1 tablet in the Y-coordinate detection mode.

After the detection of the X-coordinate, the tablet 20 is similarly put in the Y-coordinate detecting mode in which to detect the Y-coordinate of the contact position P. FIG. 4 shows the pressure sensitive 3D tablet 20 with the potential gradient being developed in the Y-coordinate resistance sheet 9 in the Y-coordinate detection mode.

As depicted in FIG. 4, the reference detecting voltage $V_{CC}$ is applied via the electronic switch 6 to the positive electrode 9a of the Y-coordinate resistance sheet 9 and the negative electrode 9b is grounded via the electronic switch 7 to form a uniform potential gradient in the Y-coordinate resistance sheet 9.

Moreover, the electronic switch 4 connected to the negative electrode 8b of the X-coordinate resistance sheet 8 is turned off to prevent a current flow thereto from the position of contact with the Y-coordinate resistance sheet 9 and the input/output terminal IX$^+$ connected to the positive electrode 8a is connected via the electronic switch 5 to the input terminal AD1 of the AD converter 2 to detect the potential at the contact position P from the positive electrode 8a.

As is the case with the detection of the X-coordinate, the Y-coordinate ($y_p$) of the contact position P is detected by the CPU 1 through calculation from the potential $V_{yp}$ detected at the input terminal AD1.

Following this, the pressure sensitive 3D tablet 20 is returned to the contact resistance detection mode. In the contact resistance detection mode after the detection of the stylus pressure, the CPU 1 only computes the contact resistance $r_p$ by the above-mentioned method until the detection of removal of the stylus pressure. The decision about the removal of the stylus pressure is made, for example, when it is detected in the computation of the contact resistance $r_p$ that the first potential difference $V_A$ is "0", i.e. that no current flows through the reference resistor $R_C$.

The X- and Y-coordinate detection modes and the contact resistance detection mode are repeated until the removal of the stylus pressure is decided as described above, and in the respective modes the X- and Y-coordinates ($x_p$) and ($y_p$) and the contact resistance $r_p$ at the contact position are detected.

Based on the X- and Y-coordinates ($x_p$) and ($y_p$) and the contact resistance $r_p$ thus detected, the CPU 1 creates tablet manipulation data. In this instance, abnormal values are removed from respective detected pieces of data such as repeatedly detected contact resistance values $r_p$ and, if necessary, they are multiplied by a predetermined constant to generate the tablet manipulation data, which is provided via an output port (not shown) to a personal computer or similar equipment within a predetermined period.

Since the X- and Y-coordinates ($x_p$) and ($y_p$) of the contact position P, and the contact resistance $r_p$ at that position contained in the tablet manipulation data, are independent parameters representing the application of the stylus pressure to the tablet 20, the tablet manipulation data can be provided as independent 3D data. The contact resistance $r_p$ decreases with an increase in the stylus pressure applied to the tablet or increase in the stylus pressure per unit contact area by decreasing the contact area at the position where the stylus is being pressed. Hence, by changing the stylus pressure while shifting the position of the stylus being pressed against the tablet, it is possible to obtain 3D data which continuously varies with the tablet manipulation.

In the contact resistance detection mode, when it is decided that the tablet is not being pressed by the stylus, the tablet 20 returns to its waiting state.

Next, a description will be given of the initialization method by which the resistance value $r_C$ of the variable resistor $R_C$ as the reference resistor is adjusted to the stylus pressure detecting threshold value $r_T$. This initialization is to adjust the resistance value $r_C$ of the variable resistor $R_C$ while checking operations in the coordinate detecting modes by pressing the tablet on a trial basis.

That is, to adjust the resistance value $r_C$ of the variable resistor $R_C$ to a value equal to the contact resistance detecting threshold value $r_T$, the tablet is pressed upon each change of the resistance value $r_C$ of the variable resistor $R_C$ and the contact resistance detection mode and the X- and Y-coordinate detection modes are repeated and the operation of the tablet 20 is checked in each mode.

When the resistance value $r_C$ of the variable resistor $R_C$ is smaller than the minimum stable value $r_{MIN}$ of the contact resistance $r_p$, the second potential difference $V_B$ will not go below the first potential difference $V_A$, so that the stylus pressure is not detected. When the resistance value $r_C$ is too much larger than the minimum stable value $r_{MIN}$, it is decided that the stylus is being pressed against the tablet 20 before the contact resistance $r_p$ becomes negligibly smaller than the internal resistance $R_A$ of the AD converter 2, and the tablet 20 goes into the subsequent X- and Y-coordinate detection modes. Hence, the contact resistance $r_p$ sharply decreases during the coordinate detection, resulting in an error arising in coordinate detected data.

In other words, the resistance value $r_C$ of the variable resistor $R_C$ is adjusted to the contact resistance detecting threshold value $r_C$, which is sufficiently smaller than the internal resistance $R_A$ of the AD converter 2, but somewhat larger than the minimum stable value $r_{MIN}$, so that the pressure sensitive 3D tablet 20 detects the application thereto of the stylus pressure without fail, and a change in the contact resistance $r_p$ after the detection of the stylus pressure will not affect the subsequent coordinate detection.

Incidentally, if the contact resistance value $r_C$ is known prior to initialization, the above-described initialization could be omitted by using a reference resistor $R_C$ of about the same resistance value $r_C$ as the contact resistance value $r_C$.

While in the above embodiment the resistance value $r_C$ of the variable resistor $R_C$ is set at a value equal to the stylus pressure detecting threshold value $r_T$, and the first and second potential differences $V_A$ and $V_B$ are compared to detect the application of the stylus pressure, the resistance value $r_C'$ of the reference resistor $R_C$ may be set at a value $r_C/N$ which is 1/N (N being a constant equal to or greater than 1) of the stylus pressure detecting threshold value $r_T$.

Where the resistance value $r_C'$ of the reference resistor $R_C$ is changed as mentioned above, its relationship with the contact resistance $r_p$ in the contact resistance detection mode can be expressed by $r_p/r_C'=V_B/V_A$, and $r_p/r_T=V_B/NV_A$ from $r_C'=r_T/N$. Hence, the application of the stylus pressure can be detected by comparison between a potential difference across the reference resistor $R_C'$, which is N times larger than the first potential difference $V_A$, and the second potential difference $V_B$. Further, in the contact resistance detection mode, the contact resistance $r_p$ can be detected by $r_p=r_C'*V_B/V_A$.

According to the present invention, the reference resistor $R_C$ need not always be disconnected from the resistance sheets 8 and 9 in the X- and Y-coordinate detection modes, but since the resistance value $r_C'$ of the reference resistor $R_C$ can be reduced arbitrarily as described above, the coordinate detecting resolution will not seriously be affected even if the reference detecting voltage $V_{CC}$ is applied to the reference resistor $R_C'$ at one end $IX^+$ thereof to develop a uniform potential gradient in the resistance sheet 8.

While the first embodiment has been described to detect the contact resistance $r_p$ by applying the reference detecting voltage $V_{CC}$ via the reference resistor $R_C$ to one of the resistance sheets, it is also possible to employ a configuration in which the reference resistor $R_C$ is connected to the other resistance sheet, which is connected to the grounding terminal via the reference resistor $R_C$ to detect the contact resistance $r_p$.

Figure 5:
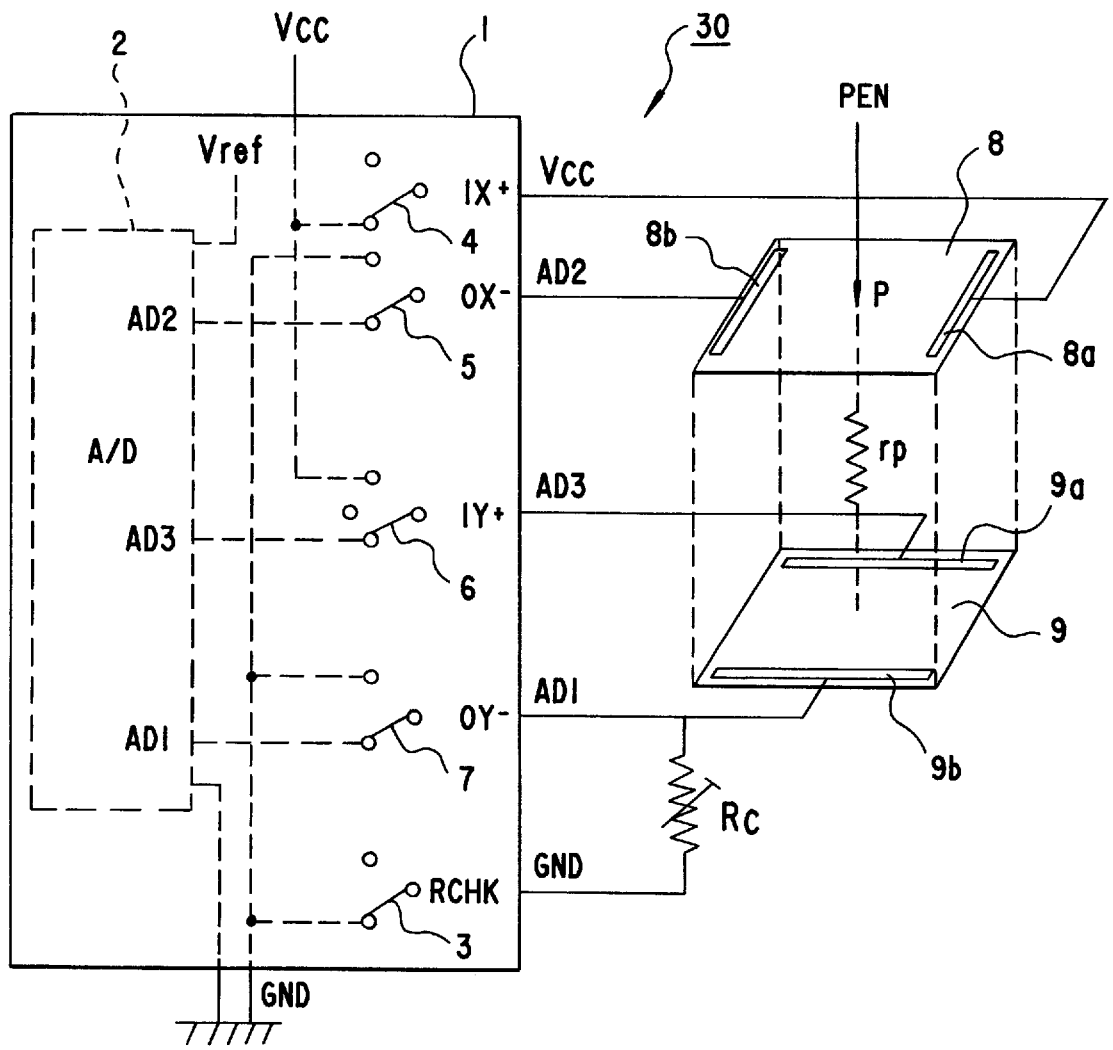
FIG. 5 is a circuit diagram of a pressure sensitive 3D tablet according to a second embodiment of the present invention.
Figure 6:
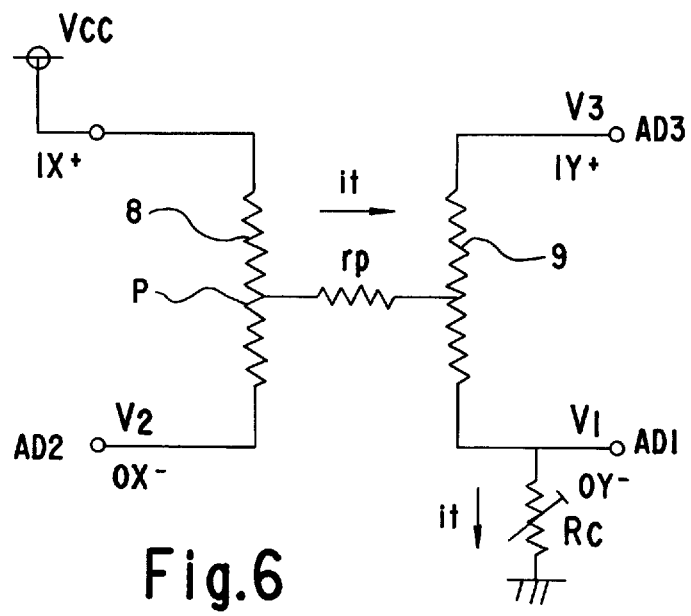
FIG. 6 is an equivalent circuit diagram of the FIG. 5 tablet in the contact resistance detection mode.

Turning now to FIGS. 5 and 6, a pressure sensitive 3D tablet 30 according to a second embodiment of the present invention will hereinbelow be described.

FIG. 5 illustrates the pressure sensitive 3D tablet in a state in which the variable resistor $R_C$, as a reference resistor, is connected at one end to the negative electrode 9b of the Y-coordinate resistance sheet 9, which is a grounded resistance sheet, and the variable resistor $R_C$ is grounded at the other end. In this state, as is the case with the first embodiment, the resistance value of the reference resistor $R_C$ is initialized to put the tablet in the contact resistance detection mode.

The pressure sensitive 3D tablet 30 of this embodiment is almost identical in configuration with the first embodiment (see FIG. 1), except that the internal circuits of the CPU 1, which are switched by the electronic switches 3 to 7, differ from the CPU circuits in the latter, and the other end of the reference resistor $R_C$, connected to the terminal RCHK, is connected to the negative electrode 9b of the Y-coordinate resistance sheet 9.

As is the case with the first embodiment, the pressure sensitive 3D tablet 30 of this embodiment also initializes the resistance value $r_C$ at the stylus pressure detecting threshold value $r_T$ by repeating the pressing of the stylus against the tablet on a trial basis and adjusting the resistance value $r_C$ of the reference resistor $R_C$ while checking the operation of the tablet.

While in its waiting state in which the application of the stylus pressure is not detected, the tablet 30 is in the contact resistance detection mode. As in the first embodiment, upon detection of the application of the stylus pressure, the tablet 30 repeatedly enters and leaves the contact resistance detection mode and the X- and Y-coordinate detection modes until the detection of the removal of the stylus pressure, detecting the contact resistance $r_p$ at the contact position P and its X- and Y-coordinates $(x_p)$ and $(y_p)$ in the respective modes.

Referring next to FIG. 6, the method for detecting the contact resistance $r_p$ in the contact resistance detection mode will be described.

FIG. 6 is an equivalent circuit diagram of the pressure sensitive 3D tablet 30 shown in FIG. 5. While the tablet 30 is not pressed by the stylus, the X-coordinate resistance sheet 8 remains at the level of the reference detecting voltage $V_{CC}$ and the Y-coordinate resistance sheet 9 at the ground level.

As depicted in FIG. 6, when the X-coordinate resistance sheet 8 is pressed, the current (it) flows therefrom to the Y-coordinate resistance sheet 9 at the position P where the resistance sheet 8 is being pressed. At this time, if minute currents flowing toward the input/output terminals $IY^+$, $OX^-$ and $OY^+$ connected to the AD converter 2 are ignored, the same current (it) flows across the variable resistor $R_C$ and the contact resistor $r_p$. Letting the potential differences across the variable resistor $R_C$ and the contact resistor $r_p$ be represented by first and second potential differences $V_A'$ and $V_B'$, respectively, and the resistance value of the variable resistor $R_C$ serving as a reference resistor by $r_C$, the contact resistance $r_p$ can be detected by $r_p=r_C*V_B'/V_A'$ on the basis of the relationship $V_A'/r_C=V_B'/r_p$.

Thus, the CPU 1 detects the potential $V_1$, $V_2$ and $V_3$ at the input/output terminals $OY^-$, $OX^-$ and $IY^+$ by the AD converter 2 and computes the contact resistance $r_p$ by $r_p=r_C*V_B'/$ $V_A'$ from the first potential difference $V_A'$ obtained as the difference between the potential $V_1$ and the ground potential GND, the second potential difference $V_B'$ obtained as the difference between the potentials $V_2$ and $V_3$ and the preknown resistance value $r_C$.

The computation of the contact resistance $r_p$ is also free from the influence of the current (it) flowing across the resistance sheets 8 and 9, that is, the contact resistance $r_p$ can be detected intact even if the current (it) varies with a change in the position of contact $(x_p, y_p)$ between the resistance sheets 8 and 9. Accordingly, the contact resistance $r_p$ can be detected as a parameter entirely independent of the X- and Y-coordinates $(x_p)$ and $(y_p)$ of the contact position P.

In the X- and Y-coordinate detection modes, the electronic switch 3 connected to the terminal RCHK⁺ is turned off to disconnect the reference resistor $R_C$ from circuits of the X- and Y-coordinate resistance sheets 8 and 9 and, at the same time, a potential gradient is formed in the resistance sheets 8 and 9 alternately with each other, thereby detecting the X- and Y-coordinates of the contact position P as is the case with the first embodiment.

Turning back to FIG. 5, in the X-coordinate detection mode the input/output terminal IX⁺ is connected via the electronic switch 4 to the power supply $V_{CC}$ to apply the reference detecting voltage $V_{CC}$ to the positive electrode 8*a* of the X-coordinate resistance sheet 8 through the terminal IX⁺ and, at the same time, the input/output terminal OX⁻ is grounded via the electronic switch 5 to ground the negative electrode 8*b* of the X-coordinate resistance sheet 8 to form therein a uniform potential gradient.

Further, the input/output terminals OY⁻ and RCHK⁺ connected to the negative electrode 9*b* of the Y-coordinate resistance sheet 9 are disconnected therefrom by turning off the electronic switches 3 and 7 to prevent a current flow to the Y-coordinate resistance sheet 9 from the position of contact with the X-coordinate sheet 8. At the same time, the input/output terminal IY⁺ is connected via the electronic switch 6 to the input terminal AD3 of the AD converter 2 to detect the potential at the contact position P through the positive electrode 9*a* of the Y-coordinate resistance sheet 9.

The CPU 1 computes and detects the X-coordinate $(x_p)$ of the contact position P from the potential $V_{xp}$ thus detected at the input terminal AD3 of the AD converter 2. The method for detecting this X-coordinate $(x_p)$ is the same as that described previously with reference to the prior art example, and hence it will not be described again.

After the detection of the X-coordinate, the tablet 30 is put in the Y-coordinate detection mode. In the Y-coordinate detection mode, the electronic switches 3, 6 and 7 are operated to apply therethrough the reference detecting voltage $V_{CC}$ to the positive electrode 9*a* of the Y coordinate resistance sheet 9 and ground the negative electrode 9*b* thereof, thereby forming a uniform potential gradient in the resistance sheet 9.

Further, the electronic switch 4 connected to the negative electrode 8*b* of the X-coordinate resistance sheet 8 is turned off to prevent a current flow thereto from the position of contact with the Y-coordinate resistance sheet 9 and the input/output terminal IX⁺ connected to the positive electrode 8*a* is connected via the electronic switch 5 to the input terminal AD1 of the AD converter 2 to detect the potential at the contact position P from the positive electrode 8*a*.

As is the case with the detection of the X-coordinate, the CPU 1 computes and detects the Y-coordinate $(y_p)$ of the contact position P from the potential $V_{yp}$ detected at the input terminal AD1 of the AD converter 2. In the CPU 1 the X- and Y-coordinates $(x_p)$ and $(y_p)$ and the contact resistance $r_p$ are used to generate tablet manipulation data. This is the same as described previously and hence, no description will be repeated.

Also in the pressure sensitive 3D tablet 30 of this embodiment, the resistance value $r_C$ of the reference resistor $R_C$ can be replaced with the resistance value $r_C'$ which is 1/N (N being a constant equal to or greater than 1) of the contact resistance detecting threshold value $r_C$ as in the first embodiment. Hence, by using a reference resistor $R_C$ of a resistance value small enough not to affect the coordinate detecting resolution, the tablet 30 can be switched from the contact resistance detection mode to the X- and Y-coordinate detection modes without disconnecting the reference resistance $R_C$ from the tablet 30.

Next, a description will be given of a pressure sensitive 3D tablet according to a third embodiment of the present invention in which the positive and negative electrodes 8*a* and 8*b* of the X-coordinate resistance sheet 8 and the positive and negative electrodes 9*a* and 9*b* of the Y-coordinate resistance sheet 9 are used as auxiliary electrodes, respectively, and X-side main and grounding electrodes 8*c* and 8*d* and Y-side main and grounding electrodes 9*c* and 9*d* are disposed outside the auxiliary electrodes in parallel thereto. A reference voltage is selectively applied to the X- or Y-side main electrodes 8*c* or 9*c* and the X- or Y-side grounding electrode 8*d* or 9*d* is selectively grounded.

Figure 7:
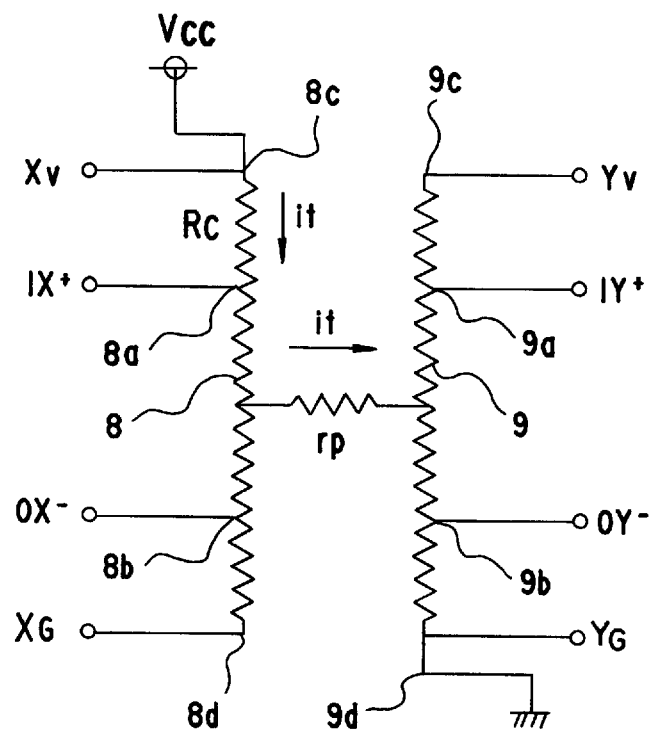
FIG. 7 is a circuit diagram of a pressure sensitive 3D tablet according to a third embodiment of the present invention.

FIG. 7 illustrates an equivalent circuit of the tablet in the contact resistance detection mode. The parts corresponding to those in the first embodiment are identified by the same reference numerals and no detailed description will be repeated.

In the contact resistance detection mode, a current flows from the X-side main electrode 8*c* supplied with the reference detecting voltage $V_{CC}$ via a route [reference resistor $R_C$—X-side positive electrode 8*a*—X-coordinate resistance sheet 8—contact resistor $r_p$ at the position $(x_p, y_p)$ of the application of the stylus pressure—Y-coordinate resistance sheet 9—Y-side negative electrode 9*b*—Y-side grounding electrode 9*d*].

At this time, since no current flows through the X-side grounding electrode 9*d* and the Y-side main electrode 9*c*, the contact resistance $r_p$ can be detected by multiplying the resistance value $r_C$ of the reference resistor $R_C$ by the ratio of the second potential difference $V_B$ to the first one $V_A$ in the same manner as described above. In this instance, the resistance value of the X-coordinate resistance sheet 8 between the X-side main electrode 8*c* and the X-side positive electrode 8*a* is used as the resistance value $r_C$ of the reference resistor $R_C$, so that the resistor $R_C$ could be dispensed with if the resistance value of the resistance sheet 8 is premeasured.

Similarly, if the resistance value of the Y-coordinate resistance sheet 9 between the Y-side main electrode 9*c* and the Y-side positive electrode 9*a*, the contact resistance $r_p$ could be detected by applying the reference detecting voltage $V_{CC}$ to the main electrode 9*c* of the Y-coordinate resistance sheet 9 and grounding the grounding electrode 8*d* of the X-coordinate resistance sheet 8.

Figure 8:
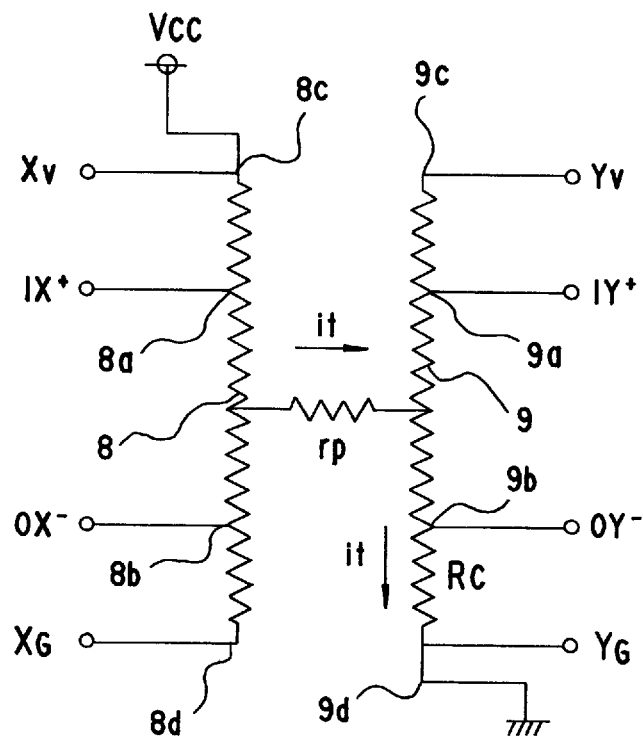
FIG. 8 is a circuit diagram of a pressure sensitive 3D tablet according to a fourth embodiment of the present invention.
Figure 9:
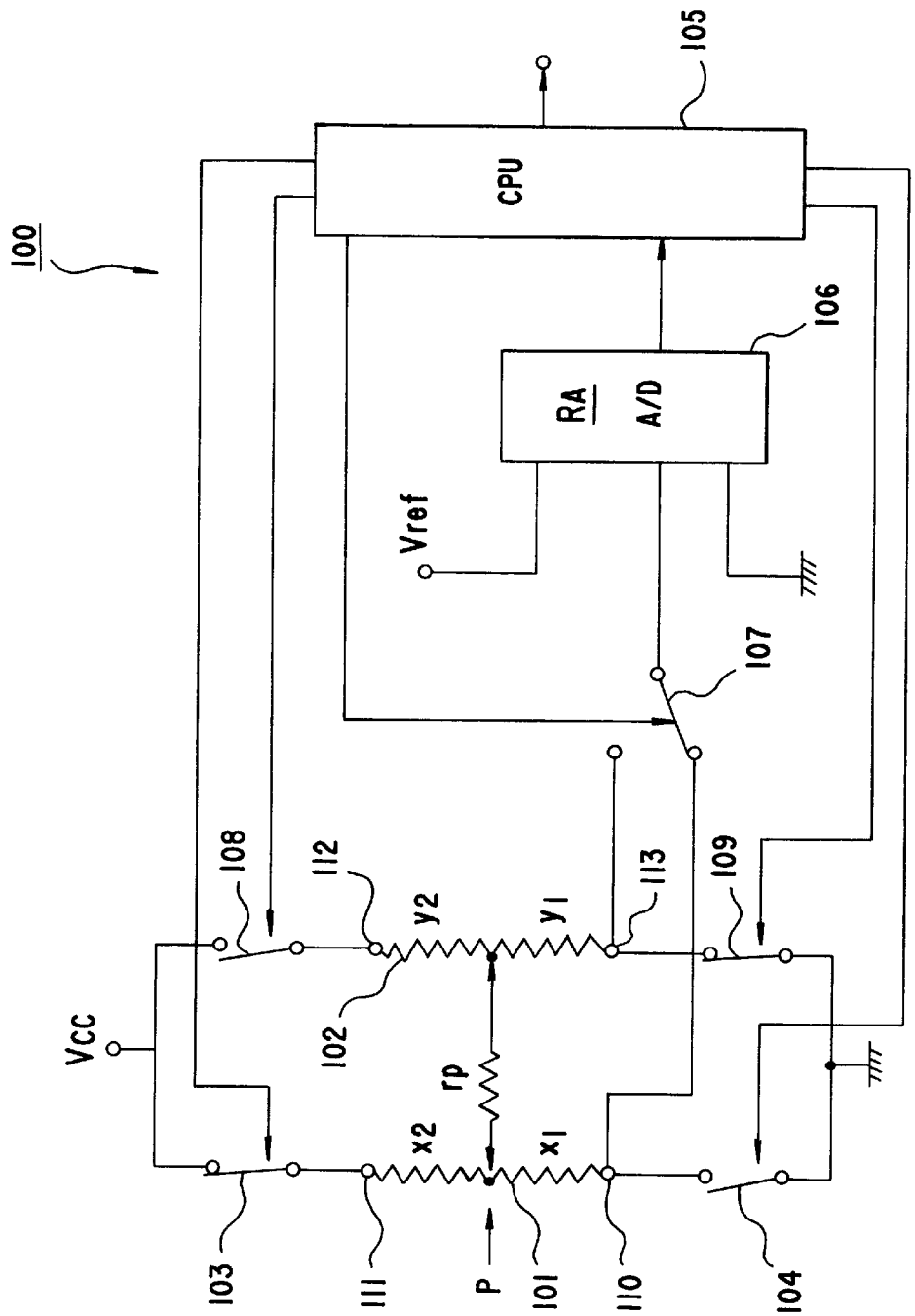
FIG. 9 is a circuit diagram showing a conventional pressure sensitive tablet.

Furthermore, the contact resistance $r_p$ could also be detected by grounding either one of the X- and Y-side grounding electrodes 8*d* and 9*d* and applying the reference detecting voltage $V_{CC}$ to the main electrode of the other resistance sheet as shown in FIG. 8. Since the contact resistance detecting method in this embodiment is the same as that used in the second embodiment, no description will be repeated.

While in the above embodiments the CPU 1 has been described to have the AD converter 2 built therein, the AD converter 2 may be provided separately of the CPU 1 as long as the former has a configuration in which potential can be read out at a minimum of three positions. Alternatively, two or more AD converters may be used.

EFFECT OF THE INVENTION

As described above, according to the present invention, only by connecting the reference resistor $R_C$ to one of the resistance sheets of the conventional pressure sensitive tablet, the contact resistance $r_p$ at the position where the tablet is being pressed can be detected.

Hence, the X- and Y-coordinates $(x_p)$ and $(y_p)$ of the position of contact between the resistance sheets and the contact resistance $r_p$, when the tablet is pressed, can be detected as 3D independent parameters, and by performing the tablet manipulation while shifting the position $(x_p, y_p)$ of pressing the tablet and changing the pressure applied thereto and the area of the application of the pressure, 3D data can be fed to equipment which is controlled, such as a personal computer.

Since the X- and Y-coordinates $(x_p)$ and $(y_p)$ and the contact resistance $r_p$ can continuously be changed by changing the stylus pressure while moving the stylus on the tablet, the 3D data can be input into the equipment under control by one operation, while at the same time, it is possible to control a movement in the direction of depth (Z) in a 3D image.

Further, since no particular input device is needed for the 3D data input into the equipment to be controlled, the tablet assembly will not become bulky and complex and hence is excellent in operability.

According to the second and fourth aspects of the invention, the X- and Y-coordinates $(x_p)$ and $(y_p)$ are detected from the potential across the auxiliary electrodes between which a uniform potential gradient is generated, so that the contact position can be detected with high resolution. Besides, since the resistance between the main electrode and the auxiliary electrode is used as the reference resistor $R_C$, there is no need of preparing it separately.

According to the fifth aspect of the invention, the application of the stylus pressure is detected independently of the current value in the tablet which differs according to the position thereon of the stylus pressure being applied, because the application of the stylus pressure is detected by comparing voltage drops across the contact resistance $r_p$ and the reference resistance $R_C$.

According to the sixth aspect of the invention, since the reference resistor $R_C$ is a variable resistor, the stylus pressure detecting threshold value $r_T$ can be set such that a change in the contact resistance $r_p$ does not affect the detection of the X- and Y-coordinates, by repeatedly applying the stylus pressure to the tablet on a trial basis and changing the resistance value $r_C$ of the reference resistor $R_C$ while checking the tablet operation.

Additionally, since the stylus pressure detecting threshold value $r_T$ can be adjusted using the resistance value $r_C$ of the reference resistor $R_C$, no storage part is needed to store the value $r_T$.

Even if the resistance value $r_C$ of the reference resistor $R_C$ is set arbitrarily, the contact resistance $r_p$ can be detected, so that the reference detecting voltage $V_{CC}$ can be applied to the resistance sheet concerned via the other end of the reference resistor $R_C$ in the coordinate detection mode, after the resistance value $r_C$ is reduced to such an extent as not to affect the coordinate detecting resolution.

It will be apparent that many modifications and variations may be effected without departing from the scope of the novel concepts of the present invention.

What is claimed is:

1. A pressure sensitive 3D tablet comprising:
    an X-coordinate resistance sheet (8) having an X-side positive electrode (8a) and an X-side negative electrode (8b) formed thereon along opposite marginal edges thereof in an X-direction;
    a Y-coordinate resistance sheet (9) having a Y-side positive electrode (9a) and a Y-side negative electrode (9b) formed thereon along opposite marginal edges in a Y-direction crossing said X-direction at right angles thereto, said Y-coordinate resistance sheet (9) being held opposite said X-coordinate resistance sheet (8) with a slight insulating gap defined therebetween;
    a reference resistor $R_C$ connected at a first end to either one of said X- and Y-side positive electrodes (8a) and (9a);
    reference voltage applying means for selectively applying a reference detecting voltage $V_{CC}$ to any one of a second end of said reference resistor $R_C$, said X-side positive electrode (8a) and said Y-side positive electrodes (9a);
    grounding means for selectively grounding either one of said X- and Y-side negative electrodes (8b) and (9b);
    an X-coordinate detection mode in which said reference detecting voltage $V_{CC}$ is applied to said X-side positive electrode (8a) or said second end of said reference restore $R_C$ connected thereto and said X-side negative electrode (8b) is grounded to form a uniform potential gradient in said X-coordinate resistance sheet (8), then a potential $V_{xp}$ at a position of contact $(x_p, y_p)$ between said X- and Y-coordinate resistance sheets (8) and (9) is read out via said Y-coordinate resistance sheet (9), and an X coordinate $(x_p)$ of said contact position is detected from said potential $V_{xp}$;
    a Y-coordinate detection mode in which said reference detecting voltage $V_{CC}$ is applied to said Y-side positive electrode (9a) or said second end of said reference resistor $R_C$ connected thereto and said Y-side negative electrode (9b) is grounded to form a uniform potential gradient in said Y-coordinate resistance sheet (9), then a potential $V_{yp}$ at said contact position $(x_p, y_p)$ between said X- and Y-coordinate resistance sheets (8) and (9) is read out via said X-coordinate resistance sheet (8), and a Y-coordinate $(y_p)$ of said contact position is detected from said potential $V_{yp}$;
    a contact resistance detection mode in which said reference detecting voltage $V_{CC}$ is applied to said second end of said reference resistor $R_C$ connected to said positive electrode of either one of said X- and Y-coordinate resistance sheets (8) and (9), then said negative electrode of any of said X- and Y-coordinate resistance sheet (8) or (9) not having said positive electrode connected to said second end of reference resistor $R_C$ is grounded, and said potentials $V_{xp}$, $V_{yp}$ of said positive and negative electrodes of said resistance sheet supplied with said detecting voltage $V_{CC}$ and said positive electrode of said grounded resistance sheet are read out, and in which, letting a first potential difference between a potential $V_1$ of said positive electrode of said resistance sheet supplied with said detecting voltage $V_{CC}$ and said reference detecting voltage $V_{CC}$ be represented by $V_A$, a second potential difference between a potential $V_2$ of said negative electrode of said resistance sheet supplied with said detecting voltage $V_{CC}$ and said potential $V_1$ of said positive electrode of said grounded resistance sheet by $V_B$ and a resistance value of said reference resistor $R_C$ by $r_C$, a contact resistance $r_p$ at said contact position $(x_p, y_p)$ is detected by $r_p = r_C * V_B / V_A$; and wherein said X- and Y-coordinates $(x_p)$ and $(y_p)$ that have been detected and said contact resistance $r_p$ at said contact position are used to output tablet manipulation data.

2. A pressure sensitive 3D tablet comprising:

an X-coordinate resistance sheet (8) having an X-side main electrode (8c) and an X-side grounding electrode (8d) formed thereon along opposite marginal edges in an X-direction and an X-side positive electrode (8a) and an X-side negative electrode (8b) formed as auxiliary electrodes inside said X-side main electrode (8c) and said X-side grounding electrode (8d) in parallel therewith;

a Y-coordinate resistance sheet (9) having a Y-side main electrode (9c) and a Y-side grounding electrode (9d) formed thereon along opposite marginal edges in a Y-direction crossing said X-direction at right angles thereto and a Y-side positive electrode (9a) and a Y-side negative electrode (9b) formed as auxiliary electrodes inside said Y-side main electrode (9c) and said Y-side grounding electrode (9d) in parallel therewith, said Y-coordinate resistance sheet (9) being held opposite said X-coordinate resistance sheet (8) with a slight insulating gap defined therebetween;

reference voltage applying means for selectively applying a reference detecting voltage $V_{CC}$ to either one of said X- and Y-side main electrodes (8c)) and (9c);

grounding means for selectively grounding either one of said X- and Y-side grounding electrodes (8d) and (9d);

an X-coordinate detection mode in which said reference detecting voltage $V_{CC}$ is applied to said X-side main electrode (8c)) and said X-side grounding electrode (8d) is grounded to form a uniform potential gradient between said X-side positive and negative electrodes (8a) and (8b), then a potential $V_{xp}$ at a position of contact $(x_p, y_p)$ between said X- and Y-coordinate resistance sheets (8) and (9) is read out via said Y-coordinate resistance sheet (9), and an X coordinate $(x_p)$ of said contact position is detected from said potential $V_{xp}$;

a Y-coordinate detection mode in which said reference detecting voltage $V_{CC}$ is applied to said Y-side main electrode (9c) and said Y-side grounding electrode (9d) is grounded to form a uniform potential gradient between said Y-side positive and negative electrodes (9a) and (9b), then a potential $V_{yp}$ at said contact position $(x_p, y_p)$ between said X- and Y-coordinate resistance sheets (8) and (9) is read out via said X-coordinate resistance sheet (8), and a Y-coordinate $(y_p)$ of said contact position is detected form said potential $V_{yp}$;

a contact resistance detection mode in which said reference detecting voltage $V_{CC}$ is applied to said main electrode of either one of said X- and Y-coordinate resistance sheets (8) and (9), then said grounding electrode of any one of said X- and Y-coordinate resistance sheet (8) or (9) not having said reference detecting voltage $V_{CC}$ applied thereto, is grounded, and said potentials $V_{xp}$, $V_{yp}$ of said positive and negative electrodes of said resistance sheet supplied with said detecting voltage $V_{CC}$ and said positive electrode of said grounded resistance sheet are read out, and in which, letting a first potential difference between a potential $V_1$ of said positive electrode of said resistance sheet supplied with said detecting voltage $V_{CC}$ and said reference detecting voltage $V_{CC}$ be represented by $V_A$, a second potential difference between a potential $V_2$ of said negative electrode of said resistance sheet supplied with said detecting voltage $V_{CC}$ and a potential $V_3$ of said positive electrode of said grounded resistance sheet by $V_B$ and a resistance value between said main electrode and said positive electrode of said resistance sheet supplied with said detecting voltage $V_{CC}$ by a resistance value $r_C$ of said reference resistor $R_C$, a contact resistance $r_p$ at said contact position $(x_p, y_p)$ is detected by $r_p = r_C * V_B / V_A$; and wherein said X- and Y-coordinates $(x_p)$ and $(y_p)$ that have been detected and said contact resistance $r_p$ at said contact position are used to output tablet manipulation data.

3. A pressure sensitive 3D tablet comprising:

an X-coordinate resistance sheet (8) having an X-side positive electrode (8a) and an X-side negative electrode (8b) formed thereon along opposite marginal edges in an X-direction;

a Y-coordinate resistance sheet (9) having a Y-side positive electrode (9a) and a Y-side negative electrode (9b) formed thereon along opposite marginal edges in a Y-direction crossing said X-direction at right angles thereto, said Y-coordinate resistance sheet (9) being held opposite said X-coordinate resistance sheet (8) with a slight insulating gap defined therebetween;

a reference resistor $R_C$ connected at a first end to either one of said X- and Y-side negative electrodes (8b) and (9b);

reference voltage applying means for selectively applying a reference detecting voltage $V_{CC}$ to either one of said X- and Y-side positive electrodes (8a) and (9a);

grounding means for selectively grounding either one of said X- and Y-side negative electrodes (8b) and (9b);

an X-coordinate detection mode in which said reference detecting voltage $V_{CC}$ is applied to said X-side positive electrode (8a) and said X-side negative electrode (8b) or a second end of said reference restore $R_C$ connected thereto is grounded to form a uniform potential gradient in said X-coordinate resistance sheet (8), then a potential $V_{xp}$ at a position of contact $(x_p, y_p)$ between said X- and Y-coordinate resistance sheets (8) and (9) is read out via said Y-coordinate resistance sheet (9), and an X-coordinate $(x_p)$ of said contact position is detected from said potential $V_{xp}$;

a Y-coordinate detection mode in which said reference detecting voltage $V_{CC}$ is applied to said Y-side positive electrode (9a) and said Y-side negative electrode (9b) or said second end of said reference resistor $R_C$ connected thereto is grounded to form a uniform potential gradient in said Y-coordinate resistance sheet (9), then a potential $V_{yp}$ at said contact position $(x_p, y_p)$ between said X- and Y-coordinate resistance sheets (8) and (9) is read out via said X-coordinate resistance sheet (8), and a Y-coordinate $(y_p)$ of said contact position is detected from said potential $V_{yp}$;

a contact resistance detection mode in which said second end of said reference resistor $R_C$ connected to either one of said X- and Y-coordinate resistance sheets (8)

and (9) is grounded, then said reference detecting voltage $V_{CC}$ is applied to said positive electrode of any one of said X- and Y-coordinate resistance sheets not connected to said second end of said reference resistor $R_C$, and said potentials of said negative electrode of said resistance sheet supplied with said detecting voltage $V_{CC}$ and said positive and negative electrodes of said resistance sheet not supplied with said reference detecting voltage $V_{CC}$ are read out, and in which, letting a first potential difference between a potential $V_1$ of said negative electrode of said resistance sheet not supplied with said detecting voltage $V_{CC}$ and a ground potential be represented by $V_A'$, a second potential difference between a potential $V_2$ of said negative electrode of said resistance sheet supplied with said detecting voltage $V_{CC}$ and a potential $V_3$ of said positive electrode of said resistance sheet not supplied with said detecting voltage $V_{CC}$ by $V_B'$ and a resistance value of said reference resistor $R_C$ by $r_C$, a contact resistance $r_p$ at said contact position $(x_p, y_p)$ is detected by $r_p = r_C * V_B'/V_A'$; and wherein said X- and Y-coordinates $(x_p)$ and $(y_p)$ that have been detected and said contact resistance $r_p$ at said contact position are used to output tablet manipulation data.

4. A pressure sensitive 3D tablet comprising:

an X-coordinate resistance sheet (8) having an X-side main electrode (8c)) and an X-side grounding electrode (8d) formed thereon along opposite marginal edges thereof in an X-direction and an X-side positive electrode (8a) and an X-side negative electrode (8b) formed as auxiliary electrodes inside said X-side main electrode (8c)) and said X-side grounding electrode (8d) in parallel therewith;

a Y-coordinate resistance sheet (9) having a Y-side main electrode (9c) and a Y-side grounding electrode (9d) formed thereon along opposite marginal edges thereof in a Y-direction crossing said X-direction at right angles thereto and a Y-side positive electrode (9a) and a Y-side negative electrode (9b) formed as auxiliary electrodes inside said Y-side main electrode (9c) and said Y-side grounding electrode (9d) in parallel therewith, said Y-coordinate resistance sheet (9) being held opposite said X-coordinate resistance sheet (8) with a slight insulating gap defined therebetween;

reference voltage applying means for selectively applying a reference detecting voltage $V_{CC}$ to either one of said X- and Y-side main electrodes (8c)) and (9c); and grounding means for selectively grounding either one of said X- and Y-side grounding electrodes (8d) and (9d);

an X-coordinate detection mode in which said reference detecting voltage $V_{CC}$ is applied to said X-side main electrode (8c)) and said X-side grounding electrode (8d) is grounded to form a uniform potential gradient between said X-side positive and negative electrodes (8a) and (8b), then a potential $V_{xp}$ at a position of contact $(x_p, y_p)$ between said X- and Y-coordinate resistance sheets (8) and (9) is read out via said Y-coordinate resistance sheet (9), and an X- coordinate $(x_p)$ of said contact position is detected from said potential $V_{xp}$;

a Y-coordinate detection mode in which said reference detecting voltage $V_{CC}$ is applied to said Y-side main electrode (9c) and said Y-side grounding electrode (9d) is grounded to form a uniform potential gradient between said Y-side positive and negative electrodes (9a) and (9b), then a potential $V_{yp}$ at said contact position $(x_p, y_p)$ between said X- and Y-coordinate resistance sheets (8) and (9) is read out via said X-coordinate resistance sheet (8), and a Y- coordinate $(y_p)$ of said contact position is detected form said potential $V_{yp}$; and a contact resistance detection mode in which said grounding electrode of either one of said X- and Y-coordinate resistance sheets is grounded, then said reference detecting voltage $V_{CC}$ is applied to said main electrode of any one of said X- and Y-coordinate resistance sheet not grounded, and said potentials $V_{xp}$, $V_{yp}$ of said negative electrode of said resistance sheet supplied with said detecting voltage $V_{CC}$ and said positive and negative electrodes of said resistance sheet not supplied with said detecting voltage $V_{CC}$ are read out, and in which, letting a first potential difference between a potential $V_1$ of said negative electrode of said resistance sheet not supplied with said detecting voltage $V_{CC}$ and a ground potential be represented by $V_A'$ and a second potential difference between a potential $V_2$ of said negative electrode of said resistance sheet supplied with said detecting voltage $V_{CC}$ and a potential $V_3$ of said positive electrode of said resistance sheet not supplied with said detecting voltage $V_{CC}$ by $V_B'$ and a resistance value between said grounding electrode and said negative electrode of said resistance sheet not supplied with said detecting voltage $V_{CC}$ by a resistance value $r_C$ of said reference resistor $R_C$, a contact resistance $r_p$ at said contact position $(x_p, y_p)$ is detected by $r_p = r_C * V_B'/V_A'$; and wherein said X- and Y-coordinates $(x_p)$ and $(y_p)$ that have been detected and said contact resistance $r_p$ at said contact position are used to output tablet manipulation data.

5. The pressure sensitive 3D tablet of any one of claims 1–4, wherein when said contact resistance $r_p$ detected in said contact resistance detection mode goes below a predetermined stylus pressure detecting threshold value, a decision is made that said tablet is being pressed.

6. The pressure sensitive 3D tablet of claim 5, wherein said reference resistor $R_C$ is a variable resistor.

7. A method of detecting manipulation data for a pressure sensitive 3D tablet which is composed of a pair of opposed X- and Y-coordinate resistance sheets (8) and (9) with a slight insulating gap defined therebetween and is adapted to be manipulated by pressing one of said X- and Y-coordinate resistance sheets (8) and (9) into contact with any one of said X- and Y-coordinate resistance sheets (8) and (9) not pressed, comprising the steps of:

forming a uniform potential gradient in said X-coordinate resistance sheet (8) and detecting an X-coordinate $(x_p)$ of a position of contact $(x_p, y_p)$ with said Y-coordinate resistance sheet (9) from a potential $V_{xp}$ at said contact position;

forming a uniform potential gradient in said Y-coordinate resistance sheet (9) and detecting a Y-coordinate $(x_p)$ of a position of contact $(x_p, y_p)$ with said X-coordinate resistance sheet (8) from a potential $V_{xp}$ at said contact position;

applying a reference detecting voltage $V_{CC}$ to one of said X- and Y-coordinate resistance sheets (8) and (9) via a reference resistor $R_C$ and grounding any of said X- and Y-coordinate resistance sheets (8) and (9) not having said reference detecting voltage $V_{CC}$ applied thereto; and detecting a contact resistance $r_p$ at said contact position $(x_p, y_p)$ by $r_p = r_C * V_B/V_A$, wherein $V_A$ is a first potential difference across said reference resistor $R_C$, $V_B$ a second potential difference between said X- and Y-coordinate resistance (8) and (9) sheets at said contact position $(x_p, y_p)$ thereof and $r_C$ is a resistance value of said reference resistor $R_C$.

8. A method of detecting manipulation data for a pressure sensitive 3D tablet which is composed of a pair of opposed X- and Y-coordinate resistance sheets (8) and (9) with a slight insulating gap defined therebetween and is adapted to be manipulated by pressing one of said X- and Y-coordinate resistance sheets (8) and (9) into contact with any one of said X- and Y-coordinate resistance sheets (8) and (9) not pressed, comprising the steps of:

forming a uniform potential gradient in said X-coordinate resistance sheet (8) and detecting an X-coordinate $(x_p)$ of a position of contact $(x_p, y_p)$ with said Y-coordinate resistance sheet (9) from a potential $V_{xp}$ at said contact position;

forming a uniform potential gradient in said Y-coordinate resistance sheet (9) and detecting a Y-coordinate $(x_p)$ of a position of contact $(x_p, y_p)$ with said X-coordinate resistance sheet (8) from a potential $V_{xp}$ at said contact position;

applying a reference detecting voltage $V_{CC}$ to any one of said X- and Y-coordinate resistance sheets (8) and (9) via a reference resistor $R_C$ and grounding any one of said X- and Y-coordinate resistance sheets (8) and (9) not having said reference detecting voltage $V_{CC}$ applied thereto resistance sheet; and detecting a contact resistance $r_p$ at said contact position $(x_p, y_p)$ by $r_p = r_C * V_B'/V_A'$, wherein $V_A'$ is a first potential difference across said reference resistor $R_C$, $V_B'$ a second potential difference between said X- and Y-coordinate resistance sheets (8) and (9) at said contact position $(x_p, y_p)$ thereof and $r_C$ is a resistance value of said reference resistor $R_C$.

* * * * *